US012720639B2

(12) United States Patent
Qiu et al.

(10) Patent No.: US 12,720,639 B2
(45) Date of Patent: Aug. 25, 2026

(54) SECONDARY CELL GROUP (SCG) ACTIVATION AND DEACTIVATION AT SECONDARY NODE (SN) ADDITION

(71) Applicant: Telefonaktiebolaget LM Ericsson (publ), Stockholm (SE)

(72) Inventors: Liwei Qiu, Täby (SE); Cecilia Eklöf, Täby (SE); Icaro Leonardo Da Silva, Solna (SE); Stefan Wager, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 604 days.

(21) Appl. No.: 18/039,408

(22) PCT Filed: Dec. 20, 2021

(86) PCT No.: PCT/SE2021/051287
§ 371 (c)(1),
(2) Date: May 30, 2023

(87) PCT Pub. No.: WO2022/146220
PCT Pub. Date: Jul. 7, 2022

(65) Prior Publication Data

US 2023/0422309 A1 Dec. 28, 2023

Related U.S. Application Data

(60) Provisional application No. 63/132,123, filed on Dec. 30, 2020.

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0206* (2013.01); *H04W 74/0833* (2013.01); *H04W 74/0838* (2024.01)

(58) Field of Classification Search
None
See application file for complete search history.

(56) References Cited

U.S. PATENT DOCUMENTS

| | | | | |
|---|---|---|---|---|
| 2019/0313272 | A1* | 10/2019 | Zhou | H04W 24/10 |
| 2020/0077288 | A1* | 3/2020 | Tsuboi | H04W 24/10 |

(Continued)

FOREIGN PATENT DOCUMENTS

| | | | |
|---|---|---|---|
| EP | 3606272 | A1 | 5/2020 |

OTHER PUBLICATIONS

Huawei (rapporteur), "[AT112-e][230][eDCCA] Progressing FFS points of efficient SCG activation and deactivation (Huawei)", 3GPP TSG-RAN WG2#112-e, R2-2010733 , Online, Nov. 2-13, 2020.

(Continued)

*Primary Examiner* — Faiyazkhan Ghafoerkhan
(74) *Attorney, Agent, or Firm* — Sage Patent Group

(57) ABSTRACT

A method performed by a user equipment, UE, includes receiving a request from a master node, MN, including a secondary cell group, SCG, configuration and a mode of operation of the SCG. The method includes determining the mode of operation of the SCG based on the indication of the mode of operation of the SCG. The method includes determining whether to perform random access or to delay performing random access based on the mode of operation of the SCG. UE apparatuses, computer programs, and computer program products are also provided.

16 Claims, 17 Drawing Sheets

(51) Int. Cl.
*H04W 74/0833* (2024.01)
*H04W 74/0838* (2024.01)

(56) References Cited

U.S. PATENT DOCUMENTS

| | | | | |
|---|---|---|---|---|
| 2020/0077312 | A1* | 3/2020 | Tsuboi | H04W 36/0088 |
| 2020/0169906 | A1* | 5/2020 | Tsuboi | H04W 76/27 |
| 2020/0336364 | A1* | 10/2020 | Takahashi | H04W 76/34 |
| 2021/0037405 | A1* | 2/2021 | Bae | H04W 24/10 |
| 2021/0144807 | A1* | 5/2021 | Bae | H04W 36/0069 |
| 2021/0314831 | A1* | 10/2021 | Ozturk | H04W 36/0058 |
| 2022/0014960 | A1* | 1/2022 | Lee | H04L 5/001 |
| 2022/0022067 | A1* | 1/2022 | Kim | H04L 5/0098 |
| 2022/0030659 | A1* | 1/2022 | Kim | H04W 28/06 |
| 2022/0070724 | A1* | 3/2022 | Lee | H04W 24/08 |
| 2022/0095127 | A1* | 3/2022 | Tang | H04L 5/0098 |
| 2022/0132333 | A1* | 4/2022 | Mattam | H04L 5/0035 |
| 2022/0141904 | A1* | 5/2022 | Yilmaz | H04W 76/27 370/329 |
| 2022/0264393 | A1* | 8/2022 | Wang | H04W 36/0069 |
| 2022/0286888 | A1* | 9/2022 | Dalsgaard | H04L 5/0053 |
| 2023/0030666 | A1* | 2/2023 | Park | H04L 5/0094 |
| 2023/0103163 | A1* | 3/2023 | Xu | H04W 36/0016 370/331 |
| 2023/0128847 | A1* | 4/2023 | Purkayastha | H04W 72/231 370/329 |
| 2023/0232494 | A1* | 7/2023 | Wang | H04W 76/15 370/329 |
| 2023/0269607 | A1* | 8/2023 | Wang | H04W 52/0245 370/328 |
| 2023/0363028 | A1* | 11/2023 | Da Silva | H04W 76/15 |
| 2023/0413356 | A1* | 12/2023 | Wu | H04W 76/27 |
| 2023/0422309 | A1* | 12/2023 | Qiu | H04W 74/006 |
| 2024/0032057 | A1* | 1/2024 | Oh | H04W 72/231 |
| 2024/0032136 | A1* | 1/2024 | Zhang | H04L 5/00 |
| 2024/0049151 | A1* | 2/2024 | Oh | H04L 1/1854 |
| 2024/0196245 | A1* | 6/2024 | Kim | H04L 5/0094 |
| 2025/0055508 | A1* | 2/2025 | Islam | H04W 72/044 |
| 2025/0193781 | A1* | 6/2025 | Dalsgaard | H04L 5/0048 |

OTHER PUBLICATIONS

ZTE (moderator), "Summary of Offline Discussion on SCG (de)activation", 3GPP TSG-RAN WG3 #110-e, R3-207003 (Revision of R3-206892), Nov. 2-12, 2020, Online.

International Search Report and Written Opinion of the International Searching Authority, PCT/SE2021/051287, mailed Mar. 21, 2022, 10 pages.

Ericsson, "Efficient SCG (de)activation," 3GPP TSG-RAN WG2 #112e, Tdoc R2-2010062, Electronic meeting, Nov. 2-13, 2020, 13 pages.

ZTE Corporation et al., "Framework of SCG deactivation and activation," 3GPP TSG-RAN WG2 Meeting #111 electronic, R2-2006900, e-meeting, Aug. 17-28, 2020, 6 pages.

International Preliminary Report on Patentability of the International Preliminary Examining Authority, PCT/SE2021/051287, mailed Mar. 13, 2023, 7 pages.

3GPP TS 36.300 v16.3.0 (Sep. 2020); 3rd Generation Partnership Project; Technical Specification Group Radio Access Network; Evolved Universal Terrestrial Radio Access (E-UTRA) and Evolved Terrestrial Radio Access Network (E-UTRAN); Overall description; Stage 2 (Release 16); 390 pages.

3GPP TS 36.423 v16.3.0 (Sep. 2020); 3rd Generation Partnership Project; Technical Specification Group Radio Access Network; Evolved Universal Terrestrial Radio Access Network (E-UTRAN); X2 application protocol (X2AP) (Release 16); 496 pages.

3GPP TS 37.340 v16.3.0 (Sep. 2020); 3rd Generation Partnership Project; Technical Specification Group Radio Access Network; Evolved Universal Terrestrial Radio Access (E-UTRA) and NR; Multi-connectivity; Stage 2 (Release 16); 83 pages.

3GPP TS 38.300 v16.1.0 (Mar. 2020); 3rd Generation Partnership Project; Technical Specification Group Radio Access Network; NR; NR and NG-RAN Overall Description; Stage 2 (Release 16); 133 pages.

3GPP TS 38.300 V16.3.0 (Sep. 2020); 3rd Generation Partnership Project; Technical Specification Group Radio Access Network; NR; NR and NG-RAN Overall Description; Stage 2 (Release 16); 148 pages.

3GPP TS 38.331 v16.2.0 (Sep. 2020); 3rd Generation Partnership Project; Technical Specification Group Radio Access Network; NR; Radio Resource Control (RRC) protocol specification (Release 16); 921 pages.

3GPP TS 38.473 v16.3.1 (Oct. 2020); 3rd Generation Partnership Project; Technical Specification Group Radio Access Network; NG-RAN; F1 application protocol (F1AP) Release 16; 455 pages.

3GPP TS 36.331 v16.2.1 (Sep. 2020); 3rd Generation Partnership Project; Technical Specification Group Radio Access Network; Evolved Universal Terrestrial Radio Access (E-UTRA); Radio Resource Control (RRC); Protocol specification (Release 16); 1081 pages.

3GPP TS 38.423 v16.3.0 (Sep. 2020); 3rd Generation Partnership Project; Technical Specification Group Radio Access Network; NG-RAN; Xn application protocol (XnAP) (Release 16); 451 pages.

China Telecom, "Views on NR Rel-17," 3GPP TSG RAN Meeting #84, RP-190919, Newport Beach, USA, Jun. 3-6, 2019, 36 pages.

ETSI MCC, Report of 3GPP TSG RAN2 #107bis meeting, R2-1914301, Chongqing, China, Oct. 14-18, 2019, 283 pages.

Qualcomm Incorporated, "Introducing suspension of SCG," 3GPP TSG RAN WG2 Meeting #107, R2-1908679, Prague, Czech, Aug. 26-30, 2019, 4 pages.

* cited by examiner

LTE DC
S1-C
MASTER NODE (LTE)
LTE RRC
X2-C
SECONDARY NODE (LTE)
LTE Uu
LTE Uu
UE
LTE RRC STATE

EN-DC
S1-C
MASTER NODE (LTE)
LTE RRC
X2-C
SECONDARY NODE (NR)
NR RRC
LTE Uu
NR Uu
UE
LTE RRC MeNB STATE

NR-DC
NG-C
MASTER NODE (NR)
NR RRC
Xn-C
SECONDARY NODE (NR)
NR RRC
NR Uu
NR Uu
UE
NR RRC MASTER NODE STATE

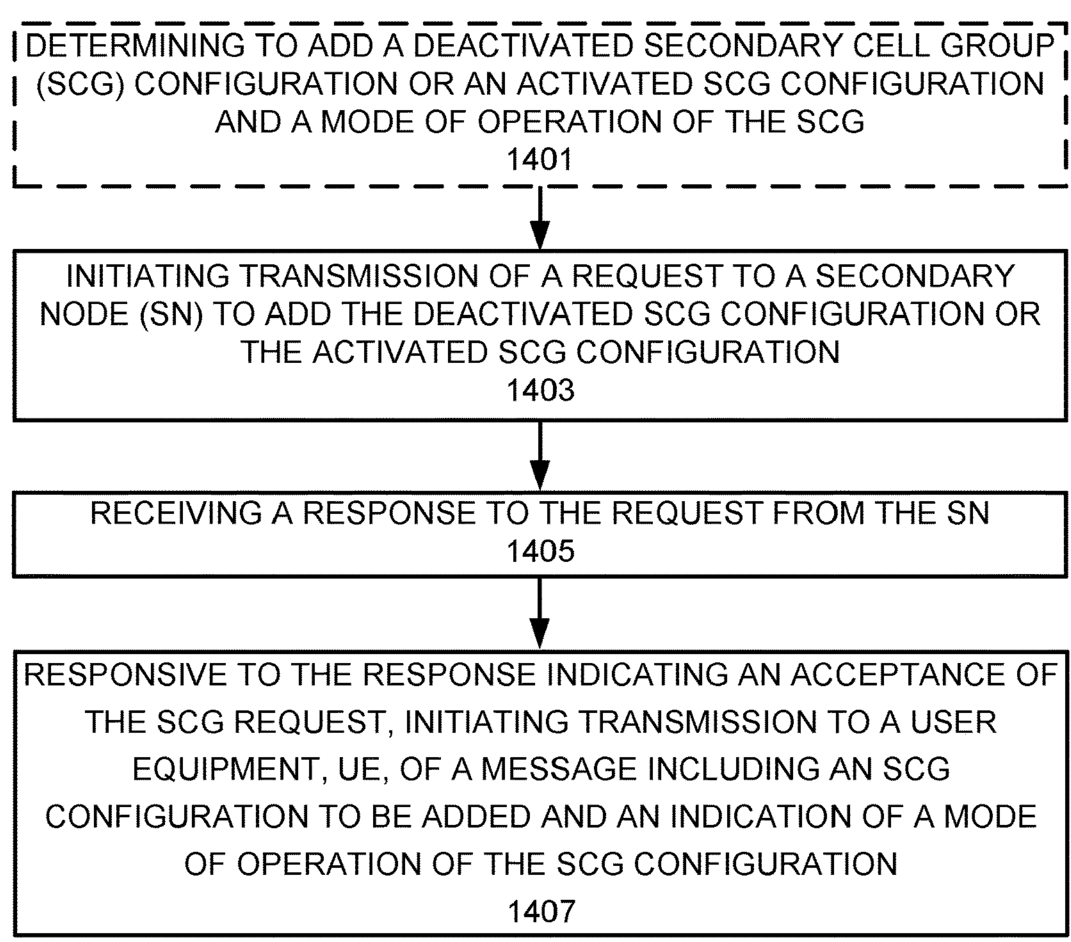

Figure 14

RECEIVING A REQUEST FROM A MASTER NODE (MN) TO ADD A DEACTIVATED SECONDARY CELL GROUP, SCG, CONFIGURATION OR AN ACTIVATED SCG CONFIGURATION
1501

INITIATING TRANSMISSION OF A RESPONSE TO THE MN, WHEREIN THE RESPONSE COMPRISES ONE OF:
- ACCEPTANCE OF ADDING THE SCG WHERE THE SCG IS ADDED ACTIVATED; OR
- ACCEPTANCE OF ADDING THE SCG WHERE THE SCG IS ADDED DEACTIVATED; OR
- REJECTION OF THE ADDITION OF THE SCG

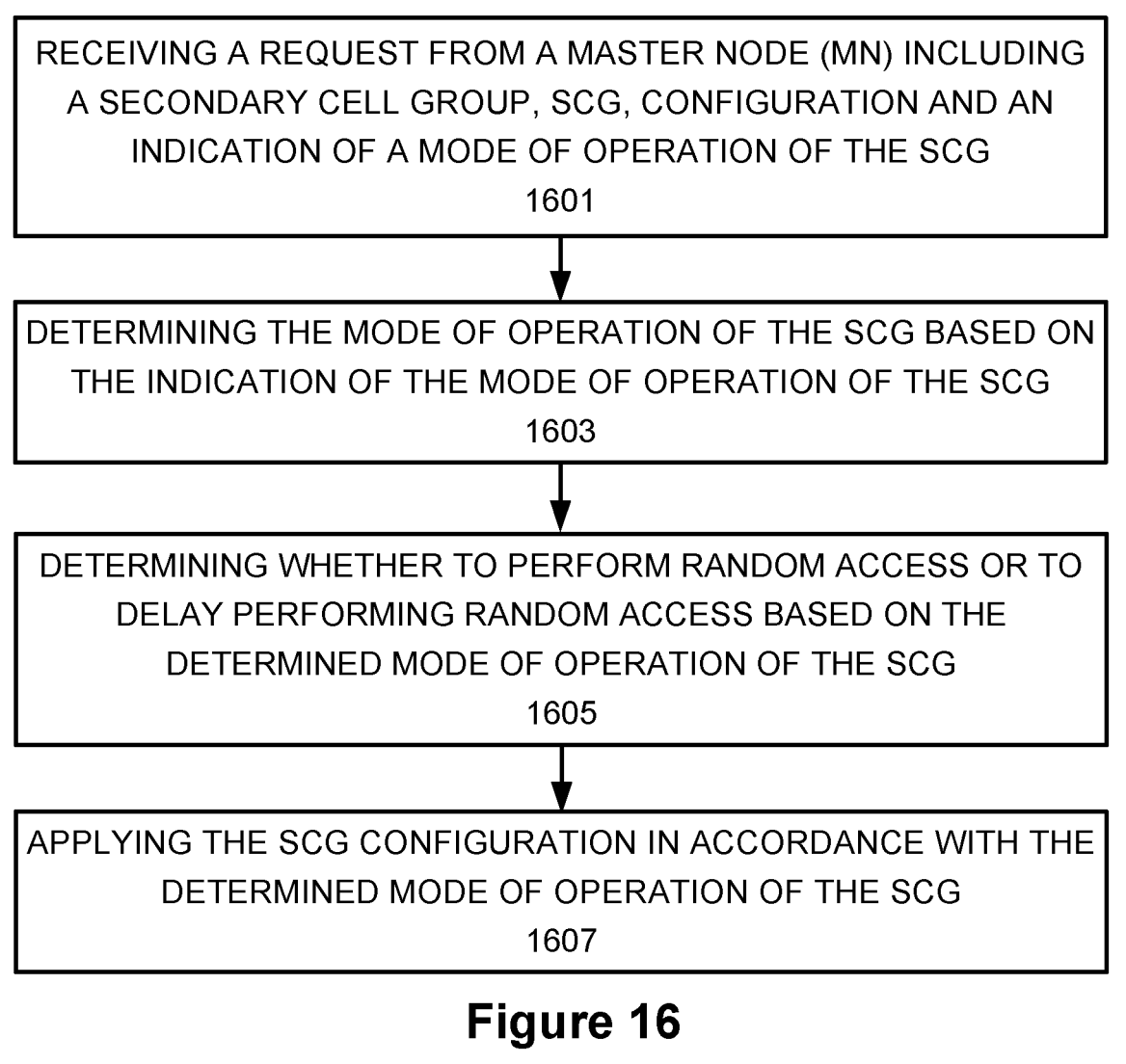

RECEIVING A REQUEST FROM A MASTER NODE (MN) INCLUDING A SECONDARY CELL GROUP, SCG, CONFIGURATION AND AN INDICATION OF A MODE OF OPERATION OF THE SCG
1601

DETERMINING THE MODE OF OPERATION OF THE SCG BASED ON THE INDICATION OF THE MODE OF OPERATION OF THE SCG
1603

DETERMINING WHETHER TO PERFORM RANDOM ACCESS OR TO DELAY PERFORMING RANDOM ACCESS BASED ON THE DETERMINED MODE OF OPERATION OF THE SCG
1605

APPLYING THE SCG CONFIGURATION IN ACCORDANCE WITH THE DETERMINED MODE OF OPERATION OF THE SCG
1607

Figure 16

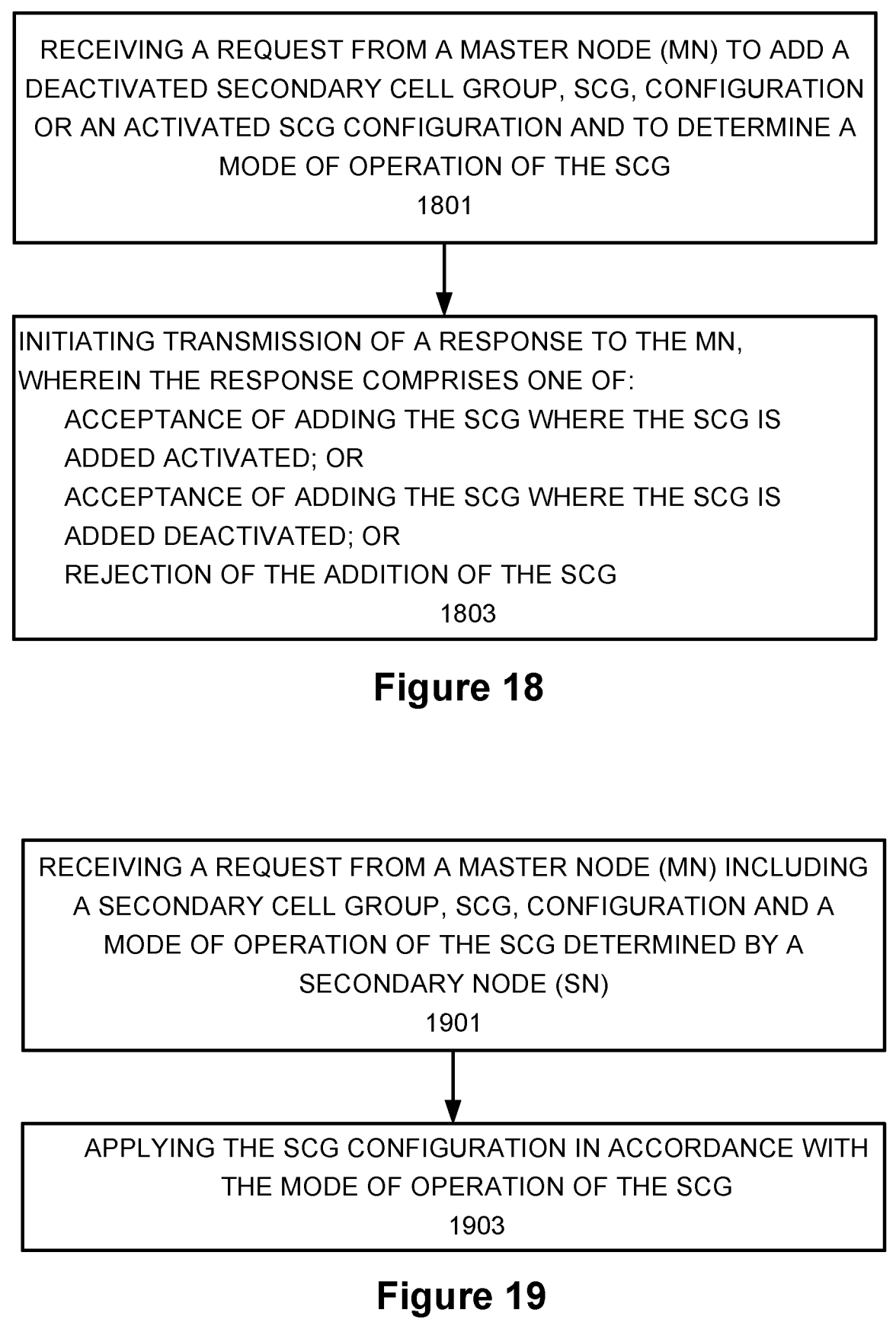

RECEIVING A REQUEST FROM A MASTER NODE (MN) TO ADD A DEACTIVATED SECONDARY CELL GROUP, SCG, CONFIGURATION OR AN ACTIVATED SCG CONFIGURATION AND TO DETERMINE A MODE OF OPERATION OF THE SCG
1801

INITIATING TRANSMISSION OF A RESPONSE TO THE MN, WHEREIN THE RESPONSE COMPRISES ONE OF:
ACCEPTANCE OF ADDING THE SCG WHERE THE SCG IS ADDED ACTIVATED; OR
ACCEPTANCE OF ADDING THE SCG WHERE THE SCG IS ADDED DEACTIVATED; OR
REJECTION OF THE ADDITION OF THE SCG
1803

Figure 18

RECEIVING A REQUEST FROM A MASTER NODE (MN) INCLUDING A SECONDARY CELL GROUP, SCG, CONFIGURATION AND A MODE OF OPERATION OF THE SCG DETERMINED BY A SECONDARY NODE (SN)
1901

APPLYING THE SCG CONFIGURATION IN ACCORDANCE WITH THE MODE OF OPERATION OF THE SCG
1903

Figure 19

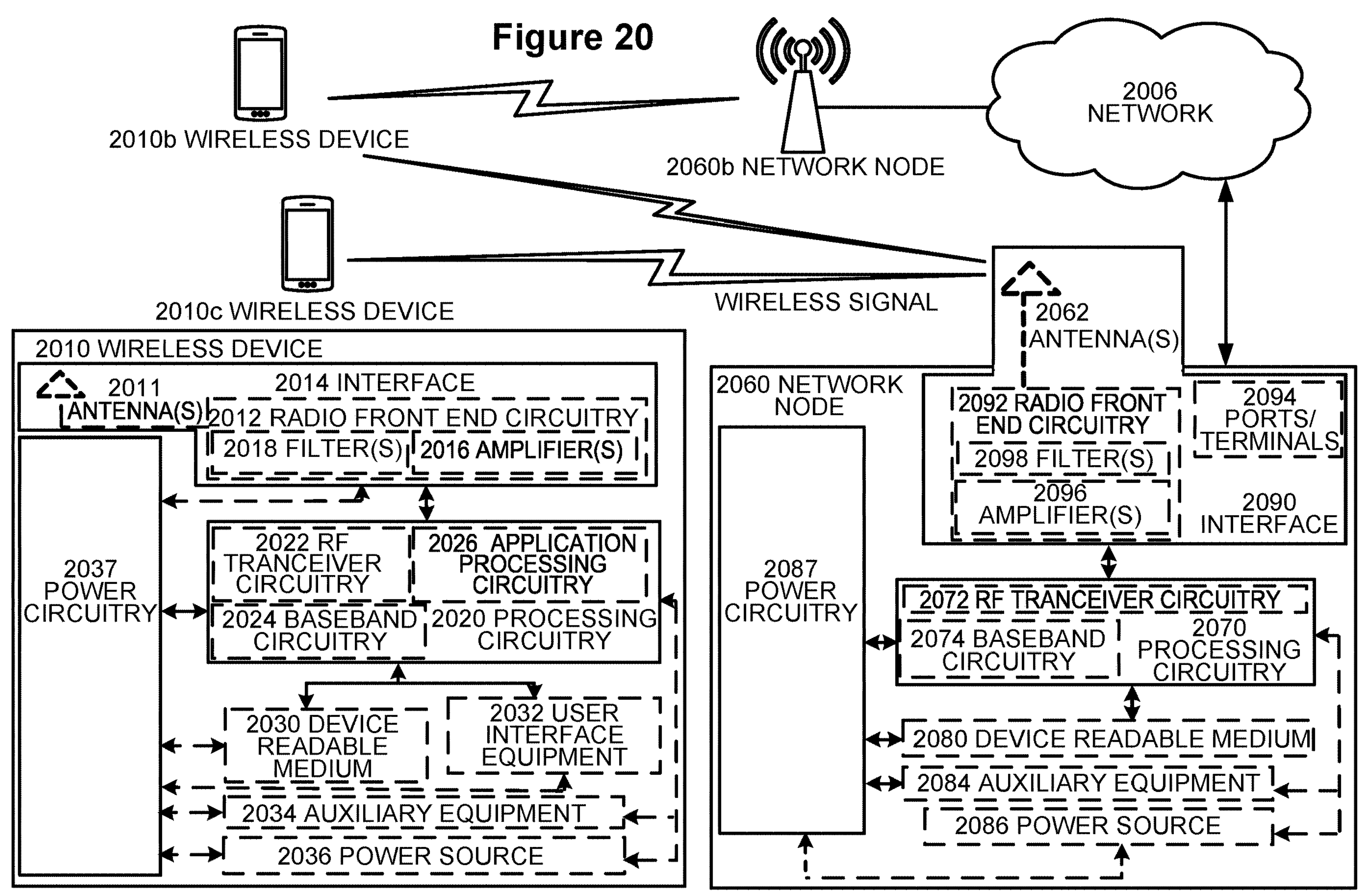
Figure 20
2010b WIRELESS DEVICE
2060b NETWORK NODE
2006 NETWORK
2010c WIRELESS DEVICE
WIRELESS SIGNAL
2062 ANTENNA(S)
2010 WIRELESS DEVICE
2011 ANTENNA(S)
2014 INTERFACE
2012 RADIO FRONT END CIRCUITRY
2018 FILTER(S)
2016 AMPLIFIER(S)
2037 POWER CIRCUITRY
2022 RF TRANCEIVER CIRCUITRY
2026 APPLICATION PROCESSING CIRCUITRY
2024 BASEBAND CIRCUITRY
2020 PROCESSING CIRCUITRY
2030 DEVICE READABLE MEDIUM
2032 USER INTERFACE EQUIPMENT
2034 AUXILIARY EQUIPMENT
2036 POWER SOURCE
2060 NETWORK NODE
2092 RADIO FRONT END CIRCUITRY
2098 FILTER(S)
2096 AMPLIFIER(S)
2094 PORTS/ TERMINALS
2090 INTERFACE
2087 POWER CIRCUITRY
2072 RF TRANCEIVER CIRCUITRY
2074 BASEBAND CIRCUITRY
2070 PROCESSING CIRCUITRY
2080 DEVICE READABLE MEDIUM
2084 AUXILIARY EQUIPMENT
2086 POWER SOURCE

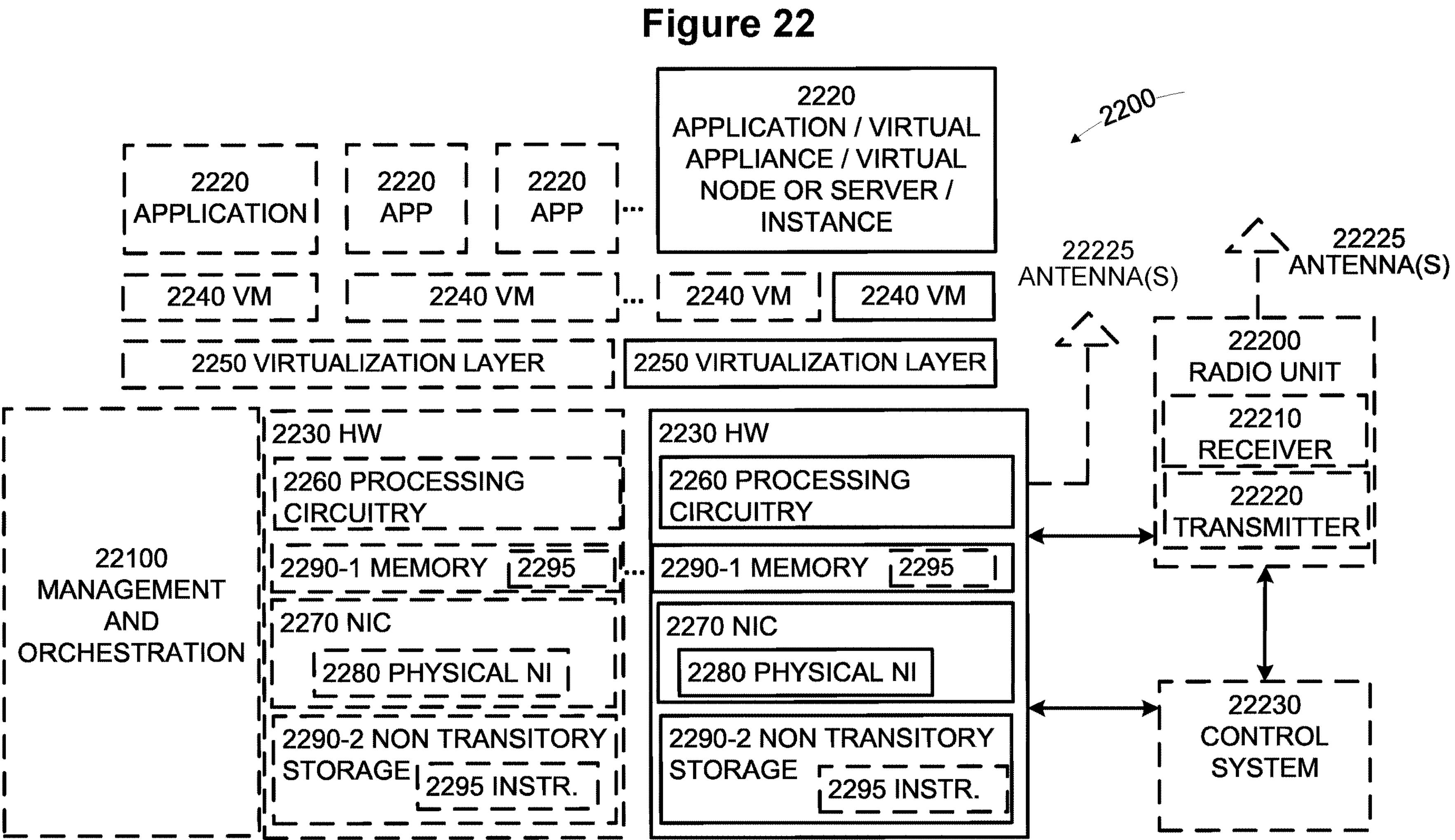
Figure 22
2200
2220 APPLICATION
2220 APP
2220 APP
2220 APPLICATION / VIRTUAL APPLIANCE / VIRTUAL NODE OR SERVER / INSTANCE
2240 VM
2240 VM
2240 VM
2240 VM
2250 VIRTUALIZATION LAYER
2250 VIRTUALIZATION LAYER
22100 MANAGEMENT AND ORCHESTRATION
2230 HW
2260 PROCESSING CIRCUITRY
2290-1 MEMORY
2295
2270 NIC
2280 PHYSICAL NI
2290-2 NON TRANSITORY STORAGE
2295 INSTR.
2230 HW
2260 PROCESSING CIRCUITRY
2290-1 MEMORY
2295
2270 NIC
2280 PHYSICAL NI
2290-2 NON TRANSITORY STORAGE
2295 INSTR.
22225 ANTENNA(S)
22225 ANTENNA(S)
22200 RADIO UNIT
22210 RECEIVER
22220 TRANSMITTER
22230 CONTROL SYSTEM

SECONDARY CELL GROUP (SCG) ACTIVATION AND DEACTIVATION AT SECONDARY NODE (SN) ADDITION

CROSS REFERENCE TO RELATED APPLICATIONS

This application is a 35 U.S.C. § 371 national stage application of PCT International Application No. PCT/SE2021/051287 filed on Dec. 20, 2021, which in turn claims domestic priority to U.S. Provisional Patent Application No. 63/132,123, filed on Dec. 30, 2020, the disclosures and content of which are incorporated by reference herein in their entirety.

TECHNICAL FIELD

The present disclosure relates generally to communications, and more particularly to communication methods and related devices and nodes supporting wireless communications.

BACKGROUND

Carrier Aggregation (CA)

When CA is configured, the user equipment (UE) only has one radio resource control (RRC) connection with the network. Further, at RRC connection establishment/re-establishment/handover, one serving cell provides the non access stratum (NAS) mobility information, and at RRC connection re-establishment/handover, one serving cell provides the security input. This cell is referred to as the Primary Cell (PCell). In addition, depending on UE capabilities, Secondary Cells (SCells) can be configured to form together with the PCell a set of serving cells. Thus, when carrier aggregation is configured for the UE, the set of serving cells used by the UE always consists of one PCell and one or more SCells.

The reconfiguration, addition, and removal of SCells can be performed by RRC. At intra-radio access technology (intra-RAT) handover, RRC can also add, remove, or reconfigure SCells for usage with the target PCell. When adding a new SCell, dedicated RRC signalling is used for sending all required system information of the SCell. Thus, while in connected mode, UEs need not acquire broadcasted system information directly from the SCells.

3GPP Dual Connectivity

In 3GPP Rel-12, the LTE (long term evolution) feature Dual Connectivity (DC) was introduced, to enable the UE to be connected in two cell groups, each controlled by an LTE access node (eNB), labelled as the Master eNB (MeNB) and the Secondary eNB (SeNB). The UE still only has one RRC connection with the network. In 3GPP, the Dual Connectivity (DC) solution has since then been evolved and is now also specified for new radio (NR) as well as between LTE and NR. Multi-connectivity (MC) is the case when there are more than 2 nodes involved. With introduction of 5G, the term MR-DC (Multi-Radio Dual Connectivity, see also 3rd generation partnership project (3GPP) technical specification (TS) 37.340) was defined as a generic term for all dual connectivity options which includes at least one NR access node. Using the MR-DC generalized terminology, the UE is connected in a Master Cell Group (MCG), controlled by the Master Node (MN), and in a Secondary Cell Group (SCG) controlled by a Secondary Node (SN).

Further, in MR-DC, when dual connectivity is configured for the UE, within each of the two cell groups, MCG and SCG, carrier aggregation may be used. In this case, within the MCG, controlled by the master node (MN), the UE may use one PCell and one or more SCell(s). And within the Secondary Cell Group, SCG, controlled by the secondary node (SN), the UE may use one Primary SCell (PSCell, also known as the primary SCG cell in NR) and one or more SCell(s). This combined case is illustrated in FIG. 1. In NR, the primary cell of a master or secondary cell group is sometimes also referred to as the Special Cell (SpCell). Hence, the SpCell in the MCG is the PCell and the SpCell in the SCG is the PSCell.

There are different ways to deploy 5G network with or without interworking with LTE (also referred to as E-UTRA (Evolved-Universal Terrestrial Radio Access) and evolved packet core (EPC). In principle, NR and LTE can be deployed without any interworking, denoted by NR standalone (SA) operation, also referred to as Option 2. In other words, the gNB in NR can be connected to the 5G core network (5GC) and the eNB in LTE can be connected to the EPC with no interconnection between the two, also referred to as Option 1.

On the other hand, the first supported version of NR uses dual connectivity, denoted as EN-DC (E-UTRAN-NR Dual Connectivity), also referred to as Option 3, as depicted in FIG. 2. In such a deployment, dual connectivity between NR and LTE is applied, where the UE is connected with both the LTE radio interface (via LTE Uu in the figure) to an LTE access node (LTE MeNB) and the NR radio interface (via NR Uu in the figure) to an NR access node (NR SgNB). Further, in EN-DC, the LTE access node acts as the master node (in this case known as the Master eNB, MeNB), controlling the master cell group, MCG, and the NR access node acts as the secondary node (in this case sometimes also known as the Secondary gNB, SgNB), controlling the secondary cell group, SCG. The SgNB may not have a control plane connection to the core network (EPC) which instead is provided to the MeNB via the S1-C/U interfaces and in this case the NR SgNB via the S1-U interface. The NR SgNB communicates with the LTE MeNB via the X2 interface. This is also called as “Non-standalone NR” or, in short, “NSA NR”. Notice that in this case the functionality of an NR cell is limited and would be used for connected mode UEs as a booster and/or diversity leg. However, an RRC IDLE UE cannot camp on these NR cells.

With introduction of 5GC, other options may be also valid. As previously, mentioned, option 2 supports standalone NR deployment where gNB is connected to 5GC. Similarly, LTE can also be connected to 5GC using option 5 (also known as eLTE, E-UTRA/5GC, or LTE/5GC and the node can be referred to as an ng-eNB). In these cases, both NR and LTE are seen as part of the NG-RAN (and both the ng-eNB and the gNB can be referred to as NG-RAN nodes).

Note that there are also other variants of dual connectivity between LTE and NR which have been standardized as part of NG-RAN connected to 5GC. For example, under the MR-DC umbrella, the variants include:

- EN-DC (Option 3): LTE is the master node and NR is the secondary node (EPC CN employed, as depicted in FIG. 2 an described above)
- NE-DC (Option 4): NR is the master node and LTE is the secondary node (5GCN employed)
- NGEN-DC (Option 7): LTE is the master node and NR is the secondary node (5GCN employed)
- NR-DC (variant of Option 2): Dual connectivity where both the master node, MN, controlling the MCG, and the secondary node, SN, controlling the SCG, are NR (5GCN employed, as depicted in FIG. 3).

In FIG. 3, the UE communicated with the NR MN and the NR SN via the NR Uu interface. The NR MN communicates with the 5GC via the NG-C/U interfaces and to the NR SN via the Xn interface. The NR SN communicates with the 5GC via the NG-U interface.

As migration for these options may differ from different operators, it is possible to have deployments with multiple options in parallel in the same network e.g. there could be eNB base station supporting option 3, 5 and 7 and NR base station supporting 2 and 4 in the same network. In combination with dual connectivity solutions between LTE and NR, it is also possible to support CA (Carrier Aggregation) in each cell group (i.e. MCG and SCG) and dual connectivity between nodes on same radio access technology (RAT) (e.g. NR-NR DC). For the LTE cells, a consequence of these different deployments is the co-existence of LTE cells associated to eNBs connected to EPC, 5GC, or both.

While DC is standardized for both LTE and E-UTRA NR DC (EN-DC), LTE DC and EN-DC are designed differently when it comes to which nodes control what. For example, LTE DC is a centralized solution while EN-DC is a decentralized solution.

FIG. 4 shows the schematic control plane architecture looks like for LTE DC, EN-DC and NR-DC. In the LTE DC, the UE is communicating with both a LTE master node and LTE secondary node via the LTE Uu interface. In LTE-DC, the RRC decisions are always coming from the MN (MN LTE RRC to UE LTE RRC state). Note however, the SN still decides the configuration of the SN, since it is only the SN itself that has knowledge of what kind of resources, capabilities etc. it has. The LTE master node communicates with the LTE secondary node via the X2-C interface and with the EPC (not shown) via the S1-C interface. The main difference with LTE DC and EN-DC and NR-DC is that in EN-DC and NR-DC, the SN has a separate NR RRC entity. This means that the SN in EN-DC and NR-DC can also control the UE LTE RRC MeNB state or UE NR RRC master node state via RRC messaging, which can sometimes be without the knowledge of the MN. However, often the SN needs to coordinate with the MN. In the EN-DC, the UE is communicating with the LTE master node via the LTE Uu interface and with the NR secondary node via the NR Uu interface. The LTE master node communicates with the NR secondary node via the X2-C interface and with the EPC (not shown) via the S1-C interface. In the NR-DC, the UE is communicating with both a NR master node and NR secondary node via the NR Uu interface. The NR master node communicates with the NR secondary node via the Xn-C interface and with the 5GC (not shown) via the NG-C interface.

For EN-DC and NR-DC, the major changes compared to LTE DC are:

The introduction of split bearer from the SN (known as SCG split bearer)

The introduction of split bearer for RRC

The introduction of a direct RRC from the SN (also referred to as SCG SRB (Signaling Radio Bearer))

FIG. 5 shows, from the network perspective, the user plane protocol architecture in MR-DC with EPC (EN-DC) where the MN is an LTE node and the SN is an NR node. The network can configure either E-UTRA packet data convergence protocol (PDCP) or NR PDCP for MN terminated MCG bearers while NR PDCP is always used for all other bearers This is illustrated by the E-UTRA/NR PDCP configuration connected to the MCG bearer on the MN and all other bearers connected with the NR PDCP configuration. E-UTRA (Evolved Universal Terrestrial Radio Access Network) RLC/MAC (radio link control/medium access control) is used in the MN while NR radio link control/medium access control (RLC/MAC) is used in the SN.

FIG. 6 shows, from the network perspective, the user plane protocol architecture in MR-DC with 5GC (NGEN-DC, NE-DC and NR-DC). In MR-DC with 5GC, NR PDCP is always used for all bearer types. In NGEN-DC, E-UTRA RLC/MAC is used in the MN while NR radio link control/medium access control (RLC/MAC) is used in the SN. In NE-DC, NR RLC/MAC is used in the MN while E-UTRA RLC/MAC is used in the SN. In NR-DC, NR RLC/MAC is used in both MN (MN RLC and MN MAC) and SN (SN RLC and SN MAC). The quality of service (QoS) flows for the bearers are connected via the service data adaptation protocol (SDAP).

Packet Duplication

Packet data convergence protocol (PDCP) packet duplication, also known as Packet Duplication or PDCP duplication, is a feature that can be used to support ultra-reliable low latency (URLLC) use-cases. PDCP duplication is configurable in both carrier aggregation (CA) as well as dual connectivity (DC).

According to 3GPP TS 38.300 v16.1.0, and depicted in FIG. 7, when duplication is configured for a radio bearer by RRC, at least one secondary RLC entity is added to the radio bearer to handle the duplicated PDCP protocol data units (PDUs), where the logical channel corresponding to the primary RLC entity is referred to as the primary logical channel, and the logical channel corresponding to the secondary RLC entity(ies), is referred to as the secondary logical channel(s).

Duplication at PDCP therefore consists in submitting the same PDCP PDUs multiple times: once to each activated RLC entity for the radio bearer. The packet duplicates are transmitted via the different carriers (cells). With multiple independent transmission paths, packet duplication therefore increases reliability and reduces latency and is especially beneficial for URLLC services.

When configuring duplication for a dedicated radio bearer (DRB), RRC also sets the state of PDCP duplication (either activated or deactivated) at the time of (re-)configuration. After the configuration, the PDCP duplication state can then be dynamically controlled by means of a MAC control element and in DC, the UE applies the MAC CE commands regardless of their origin (MCG or SCG).

SCG Power Saving Mode

In order to improve network energy efficiency and UE battery life for UEs in MR-DC, a Rel-17 work item is planned to introduce efficient SCG/SCell activation/deactivation. This can be especially important for MR-DC configurations with NR SCG, as it has been evaluated in RP-190919 that in some cases NR UE power consumption is 3 to 4 times higher than LTE.

3GPP has specified the concepts of dormant SCell (in LTE) and dormancy like behavior of an SCell (for NR). FIG. 8 is an illustration of dormancy like behavior for SCells in NR. In LTE, when an SCell is in dormant state, like in the deactivated state (i.e., a deactivated SCell), the UE does not need to monitor the corresponding PDCCH (physical downlink control channel) or PDSCH (physical downlink shared channel) and cannot transmit in the corresponding uplink. However, differently from deactivated state, the UE is required to perform and report CQI (channel quality indicator) measurements. A physical uplink control channel (PUCCH) SCell (SCell configured with PUCCH) cannot be in dormant state.

In NR, the activated state denotes a state capable of transmitting/receiving data by performing operations of a normal SCell. A deactivated state denotes a state in which a SCell is configured on a UE, but a transmission or reception operation and the like is not performed for the SCell. MAC control elements are used to transition a SCell to the activated state and to the deactivated state. An activated S Cell is also transitioned to a deactivated state upon expiration of an SCellDeactivationTimer associated with the activated SCell. To transition the SCell from the deactivated state to the activated state, a MAC CE is used to configure the SCell via RRC with the SCell state set to activated. Upon SCell activation, the BWP to be used is defined by a FirstActiveDownlinkBWP-ID. Dormancy like behavior for SCells is realized using the concept of dormant bandwidth parts (BWPs). One dormant BWP, which is one of the dedicated BWPs configured by the network via RRC signaling, can be configured for an SCell. If the active BWP of the activated SCell is a dormant BWP, the UE stops monitoring PDCCH on the SCell but continues performing channel state information (CSI) measurements, automatic gain control (AGC) and beam management, if configured. A downlink control information (DCI) is used to control entering/leaving the dormant BWP for one or more SCell(s) or one or more SCell group(s) using dormantBWP-ID (to identify a BWP for the UE for the activated SCell) and firstWithinActiveTimeBWP-Id (to identify that a current active BWP is the dormant BWP), and it is sent to the special cell (sPCell) of the cell group that the SCell belongs to (i.e. PCell in case the SCell belongs to the MCG and PSCell if the SCell belongs to the SCG). The SpCell (i.e. PCell of PSCell) and PUCCH SCell cannot be configured with a dormant BWP.

However, only SCells can be put in dormant state (in LTE) or operate in dormancy like behavior (NR). Also, only SCells can be put into the deactivated state in both LTE and NR. Thus, if the UE is configured with MR-DC, it is not possible to fully benefit from the power saving options of dormant state or dormancy like behavior as the PSCell cannot be configured with that feature. Instead, an existing solution could be releasing (for power savings) and adding (when traffic demands requires) the SCG on an as needed basis. However, traffic is likely to be bursty, and adding and releasing the SCG involves a significant amount of RRC signaling and inter-node messaging between the MN and the SN, which typically causes considerable delay.

In Release 16 (Rel-16), some discussions were made regarding putting also the PSCell in dormancy, also referred to as SCG Suspension. Some preliminary agreements were made in RAN2-107bis, October 2019 (see chairman notes at R2-1914301):

R2 assumes the following (can be slightly modified due to progress on Scell dormancy):

The UE supports network-controlled suspension of the SCG in RRC_CONNECTED.

UE Behavior for a Suspended SCG is for Further Study (FFS)

The UE supports at most one SCG configuration, suspended or not suspended, in Rel 16.

In RRC_CONNECTED upon addition of the SCG, the SCG can be either suspended or not suspended by configuration.

In RAN-2 108, further discussion was made to clarify the above for future studies (FFSs). Some solutions have been proposed in Rel-16, but these have different problems. For example, in R2-1908679 (Introducing suspension of SCG—Qualcomm) the paper proposes that gNB can indicate UE to suspend SCG transmissions when no data traffic is expected to be sent in SCG so that UE keeps the SCG configuration but does not use it for power saving purpose. Therein, it is mentioned that signaling to suspend SCG could be based on DCI/MAC-CE/RRC signaling, but no details were provided regarding the configuration from the gNB to the UE. And, differently from the defined behavior for SCell(s), PSCell may be associated to a different network node (e.g. a gNodeB operating as Secondary Node).

It is yet to be seen which behavior will be specified for SCG power saving in Release 17 (Rel-17). However, it is very likely that is going to be one or more of the following:

- The UE starting to operate the PSCell in dormancy, e.g. switching the PSCell to a dormant BWP. On the network side, the network considers the PSCell in dormancy and at least stops transmitting PDCCH for that UE in the PSCell and SCells;
- The UE deactivating the PSCell like SCell deactivation; On the network side, the network considers the PSCell as deactivated and at least stops transmitting PDCCH for that UE in the PSCell (and also on the SCells);
- The UE operating the PSCell in long discontinuous reception (DRX); SCG DRX can be switched off from the MN (e.g. via MCG RRC, MAC CE or DCI) when the need arises (e.g. DL data arrival for SN terminated SCG bearers);
- The UE suspending its operation with the SCG (e.g. suspending bearers associated with the SCG, like SCG MN-/SN-terminated bearers), but keeping the SCG configuration stored (referred to as Stored SCG); On the network side there can be different alternatives such as the SN storing the SCG as the UE does, or the SN releasing the SCG context of the UE to be generated again upon resume (e.g. with the support from the MN that is the node storing the SCG context for that UE whose SCG is suspended).

Though the power saving aspect is so far discussed from the SCG point of view, it is likely that similar approaches could be used on the MCG as well (e.g. the MCG maybe suspended or in long DRX, while data communication is happening only via the SCG).

SUMMARY

In RAN2#112e the following has been agreed concerning SN addition and SCG deactivation:

SCG RRC reconfiguration can select the SCG activation state (activated/deactivated) at PSCell addition/change, RRC resume or HO (Hand Over)

When an SCG is added, activated or deactivated, there are different scenarios that may occur depending on which node that initiates the action and which node that makes the final decision regarding if the SCG should be activated or deactivated. Currently these scenarios are not taken into account in existing specifications and solutions need to be defined.

According to further embodiments of inventive concepts, a method performed by a user equipment, UE, is provided. The method includes receiving a request from a master node, MN, including an secondary cell group, SCG, configuration and an indication of a mode of operation of the SCG. The method includes determining the mode of operation of the SCG based on the indication of the mode of operation of the SCG. The method further includes determining whether to perform random access or to delay performing random access based on the mode of operation of the SCG.

The advantage that may be achieved is that different methods for adding an activated or deactivated SCG are provided, which can be used in the work of standardizing deactivated SCG.

User equipment and computer product programs are also provided that perform analogous methods.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 14 is a flow chart illustrating operations of a master node according to some embodiments of inventive concepts;

FIG. 15 is a flow chart illustrating operations of a secondary node according to some embodiments of inventive concepts;

FIG. 16 is a flow chart illustrating operations of a user equipment according to some embodiments of inventive concepts;

FIG. 18 is a flow chart illustrating operations of a secondary node according to some embodiments of inventive concepts;

FIG. 19 is a flow chart illustrating operations of a user equipment according to some embodiments of inventive concepts;

FIG. 20 is a block diagram of a wireless network in accordance with some embodiments;

FIG. 22 is a block diagram of a virtualization environment in accordance with some embodiments;

DETAILED DESCRIPTION

Figure 1:
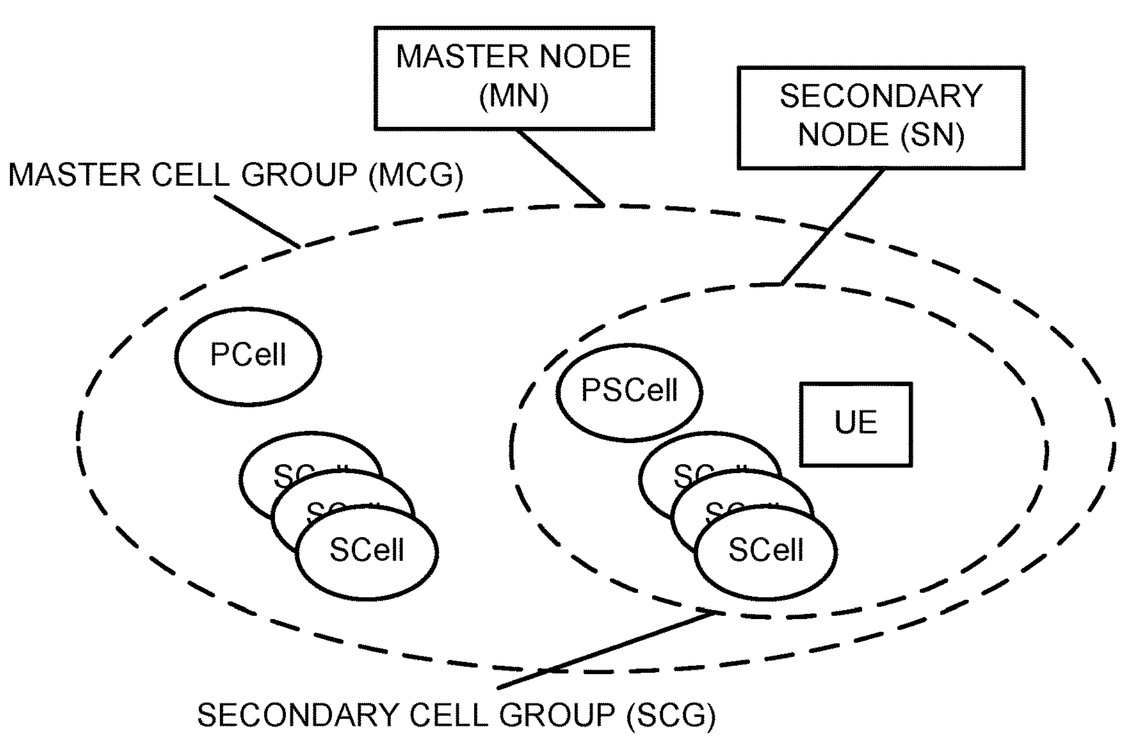
FIG. 1 is an illustration of dual connectivity combined with carrier aggregation in multi-radio dual connectivity according to some embodiments.
Figure 2:
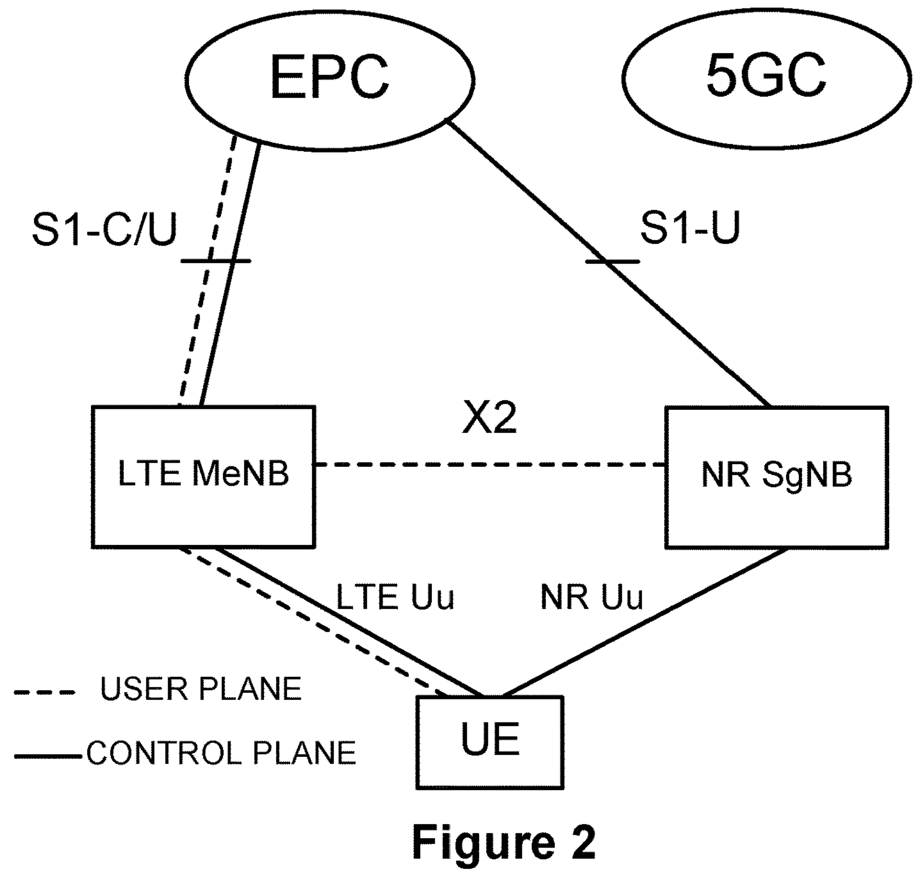
FIG. 2 is an illustration of E-UTRAN-NR Dual Connectivity (EN-DC) according to some embodiments.
Figures 3, 4:
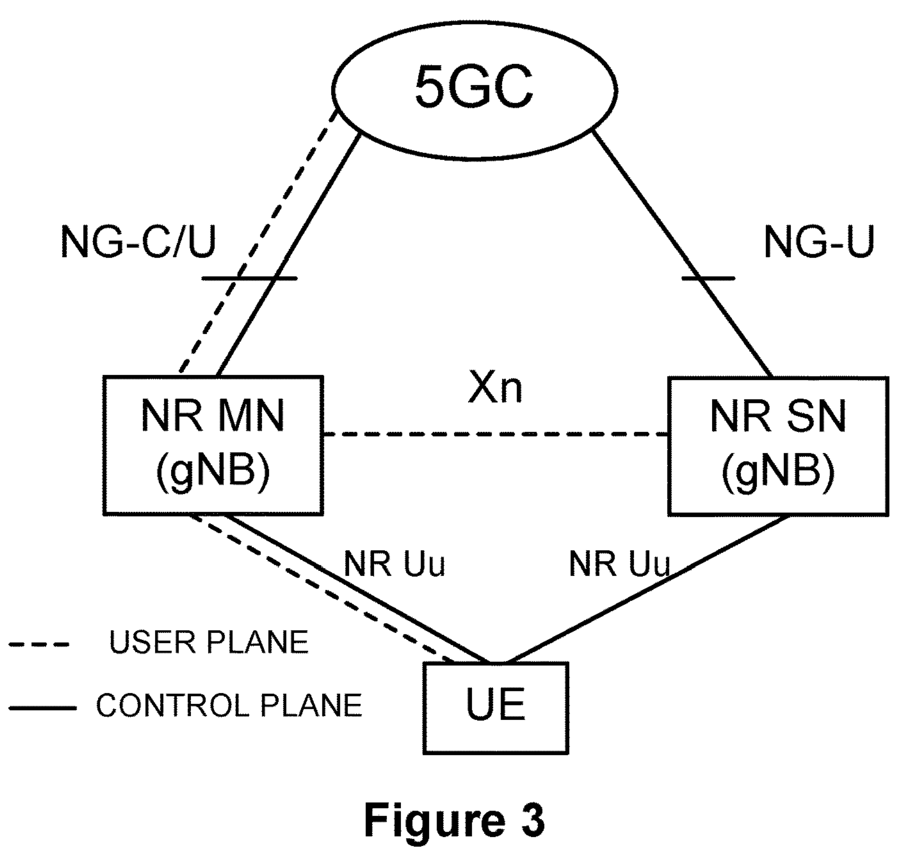
FIG. 3 is an illustration of new radio-dual connectivity (NR-DC) according to some embodiments.
FIG. 4 is an illustration of the control plane architecture for Dual Connectivity in LTE DC, EN-DC, and NR-DC according to some embodiments.
Figure 5:
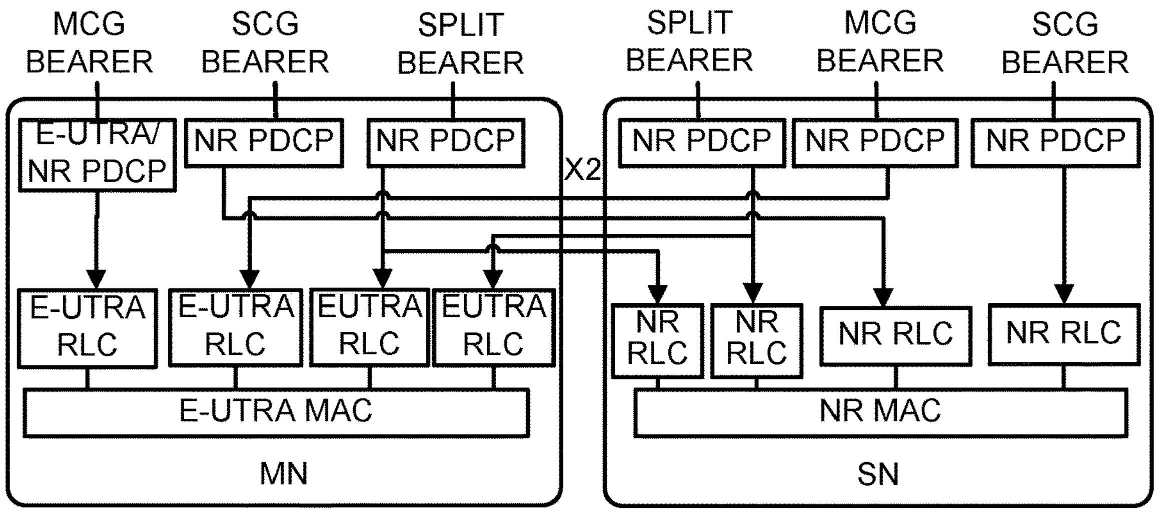
FIG. 5 is an illustration of network side protocol termination options for MCG, SCG and split bearers in MR-DC with EPC (EN-DC) according to some embodiments.
Figure 6:
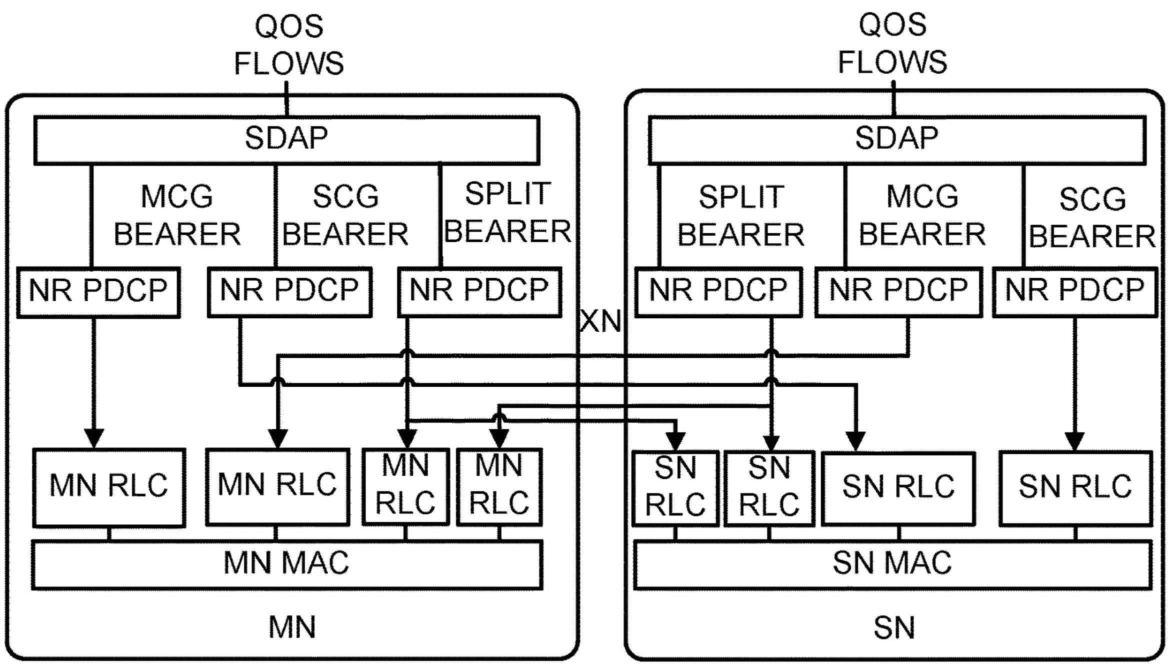
FIG. 6 is an illustration of network side protocol termination options for MCG, SCG and split bearers in MR-DC with 5GC (NGEN-DC, NE-DC and NR-DC) according to some embodiments.
Figure 7:
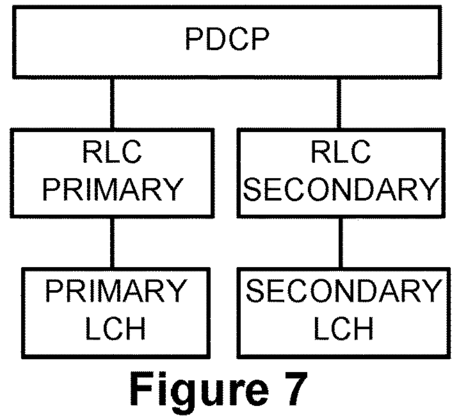
FIG. 7 is an illustration of packet duplication according to some embodiments.
Figure 8:
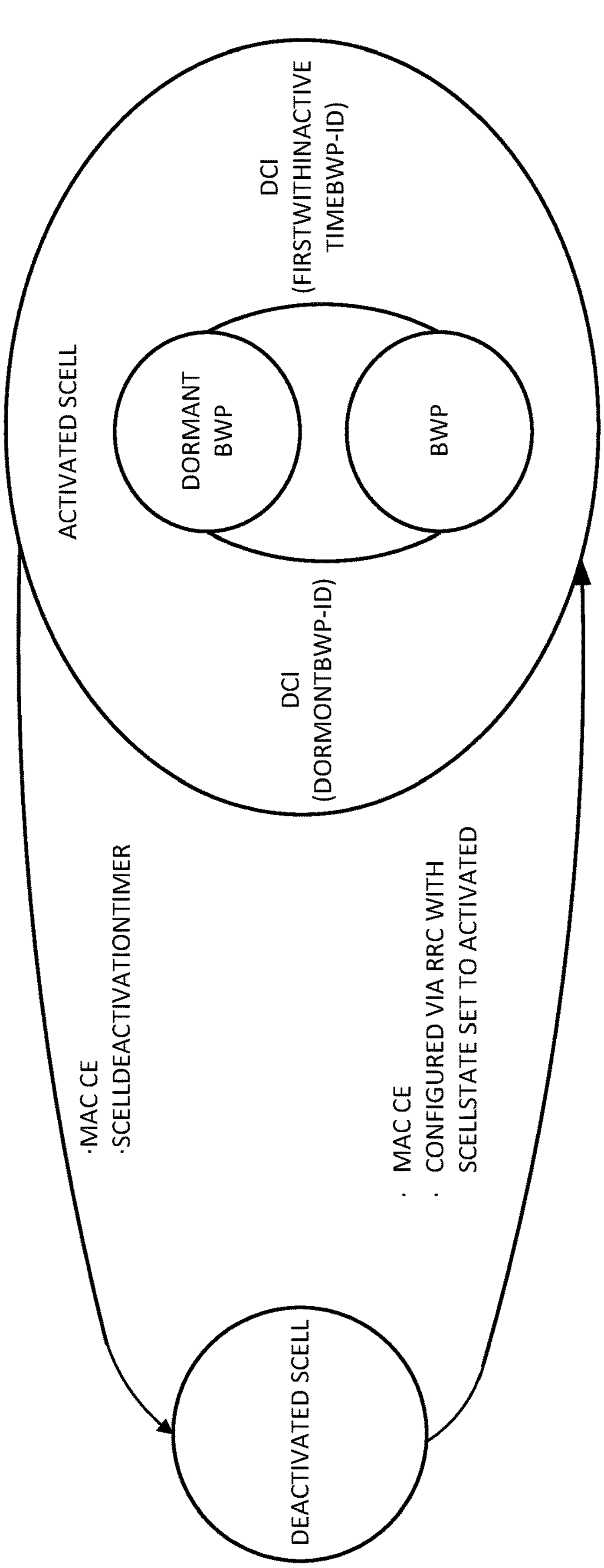
FIG. 8 is an illustration of dormancy like behavior for SCells in NR according to some embodiments.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The terms "suspended SCG", "SCG in power saving mode", or "deactivated SCG" are used interchangeably. The term "suspended SCG" may also be called as "deactivated SCG" or "inactive SCG", or "dormant SCG". The terms "resumed SCG", "SCG in normal operating mode" and "SCG in non-power saving mode" are used interchangeably. The terms "resumed SCG" may also be called as "activated SCG" or "active SCG". The operation of the SCG operating in resumed or active mode may also be called as normal SCG operation or legacy SCG operation. Examples of operations are UE signal reception/transmission procedures e.g. reception of signals/messages, transmission of signals/messages, etc.

In the description that follows, the description mostly refers to, and shows examples, wherein the second cell group is a Secondary Cell Group (SCG) for a UE configured with Multi-Radio Dual Connectivity (e.g. MR-DC).

In the description that follows, the description describes terms like SCG and PSCell, as one of the cells associated with the SCG. That can be for example a PSCell as defined in NR specifications (e.g. RRC TS 38.331 v16.2.0), defined as a Special Cell (SpCell) of the SCG, or a Primary SCG Cell (PSCell), as follows:

Secondary Cell Group: For a UE configured with dual connectivity, the subset of serving cells comprising of the PSCell and zero or more secondary cells (SCells).

Special Cell: For Dual Connectivity operation the term Special Cell refers to the PCell of the MCG or the PSCell of the SCG, otherwise the term Special Cell refers to the PCell.

Primary SCG Cell (PSCell): For dual connectivity operation, the SCG cell in which the UE performs random access when performing the Reconfiguration with Sync procedure.

In the description that follows, the description primarily refers to and shows examples wherein the second cell group is a Secondary Cell Group (SCG) that is deactivated (or suspended or in power saving mode of operation), for a UE configured with Multi-Radio Dual Connectivity (e.g. MR-DC). However, the method is equally applicable for the case where the second cell group is a Master Cell Group (MCG) for a UE configured with Dual Connectivity (e.g. MR-DC), wherein the MCG could be suspended, while the SCG is operating in normal mode.

In the description that follows, the description describes that when the second cell group is deactivated (e.g. SCG becomes deactivated upon reception of an indication from the network) the UE stops monitoring PDCCH on the SCG cells (i.e. stop monitoring PDCCH of the PSCell and of the SCells of the SCG). Solutions are mainly described using as an example a second cell group that is a Secondary Cell Group the UE configured with MR-DC is configured with, and the SCG being deactivated mode of operation at the UE when the UE perform the actions disclosed in the method. However, the method is also applicable for the case one assumes that the second cell group is a Master Cell Group (MCG) that is deactivated, so that the UE stops monitoring PDCCH on the MCG and continues monitoring PDCCH on the SCG.

Figure 9:
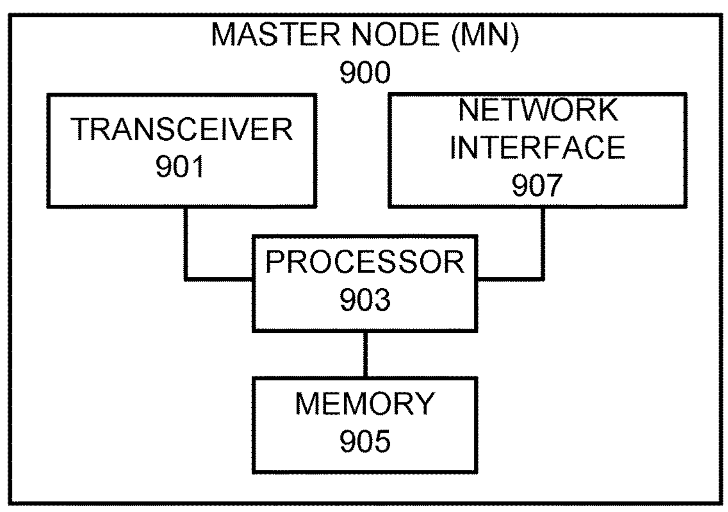
FIG. 9 is a signaling diagram illustrating operations of MN initiated SCG activation and/or deactivation where the MN decides the mode of operation according to some embodiments of inventive concepts.

Prior to describing the inventive concepts in further detail, FIG. 9 is a block diagram illustrating elements of a master node 900 (also referred to as a master network node, master base station, MeNodeB/MeNB, gNodeB/gNB, etc.) of a Radio Access Network (RAN) configured to provide cellular communication according to embodiments of inventive concepts. (Master node 900 may be provided, for example, as discussed below with respect to network node 2060 of FIG. 20, virtual hardware 2230 or virtual machine 2240 of FIG. 22, base stations 2312*a*, 2312*b*, and 2312*c* of FIG. 23 and/or base station 2420 of FIG. 24, all of which should be considered interchangeable in the examples and embodiments described herein and be within the intended scope of this disclosure, unless otherwise noted.) As shown, the master node 900 may include transceiver circuitry 901 (also referred to as a transceiver, e.g., corresponding to portions of interface 2090 of FIG. 20 and/or portions of radio interface 2427 of FIG. 24) including a transmitter and a receiver configured to provide uplink and downlink radio communications with mobile terminals. The master node may include network interface circuitry 907 (also referred to as a network interface, e.g., corresponding to portions of interface 2090 of FIG. 20 network interfaces 2270, 2280 of FIG. 22, and/or portions of communication interface 2426 of FIG. 24) configured to provide communications with other nodes (e.g., with other master base stations and secondary base stations) of the RAN and/or core network CN. The network node may also include processing circuitry 903 (also referred to as a processor, e.g., corresponding to processing circuitry 2070 of FIG. 20, processing circuitry 2260 of FIG. 22, and/or processing circuitry 2428 of FIG. 24) coupled to the transceiver circuitry, and memory circuitry 905 (also referred to as memory, e.g., corresponding to device readable medium 2080 of FIG. 20 and/or memory 2290 of FIG. 22) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the master node 900 may be performed by processing circuitry 903, network interface 907, and/or transceiver 901. For example, processing circuitry 903 may control transceiver 901 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 907 to one or more other network nodes and/or to receive communications through network interface from one or more other network nodes. Moreover, modules may be stored in memory 905, and these modules may provide instructions so that when instructions of a module are executed by processing circuitry 903, processing circuitry 903 performs respective operations (e.g., operations discussed below with respect to Example Embodiments relating to RAN nodes). According to some embodiments, master node 900 and/or an element(s)/function(s) thereof may be embodied as a virtual node/nodes and/or a virtual machine/machines.

Figure 10:
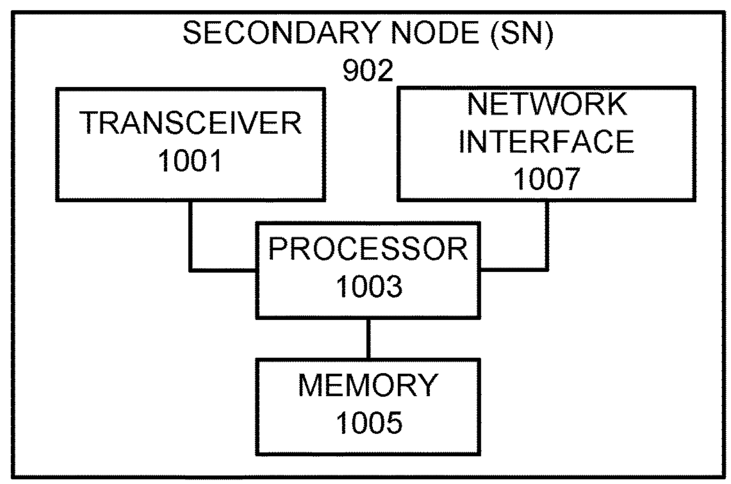
FIG. 10 is a signaling diagram illustrating operations of MN initiated SCG activation and/or deactivation where the SN decides the mode of operation according to some embodiments of inventive concepts.

FIG. 10 is a block diagram illustrating elements of a secondary node 902 (also referred to as a secondary network node, secondary base station, SeNodeB/SeNB, gNodeB/gNB, etc.) of a Radio Access Network (RAN) configured to provide cellular communication according to embodiments of inventive concepts. (Secondary node 902 may be provided, for example, as discussed below with respect to network node 2060 of FIG. 20, virtual hardware 2230 or virtual machine 2240 of FIG. 22, base stations 2312*a*, 2312*b*, and 2312*c* of FIG. 23 and/or base station 2420 of FIG. 24, all of which should be considered interchangeable in the examples and embodiments described herein and be within the intended scope of this disclosure, unless otherwise noted.) As shown, the secondary node 902 may include transceiver circuitry 1001 (also referred to as a transceiver, e.g., corresponding to portions of interface 2090 of FIG. 20 and/or portions of radio interface 2427 of FIG. 24) including a transmitter and a receiver configured to provide uplink and downlink radio communications with mobile terminals. The master node may include network interface circuitry 1007 (also referred to as a network interface, e.g., corresponding to portions of interface 2090 of FIG. 20 network interfaces 2270, 2280 of FIG. 22, and/or portions of communication interface 2426 of FIG. 24) configured to provide communications with other nodes (e.g., with other master base stations and secondary base stations) of the RAN and/or core network CN. The network node may also include processing circuitry 1003 (also referred to as a processor, e.g., corresponding to processing circuitry 2070 of FIG. 20, processing circuitry 2260 of FIG. 22, and/or processing circuitry 2428 of FIG. 24) coupled to the transceiver circuitry, and memory circuitry 1005 (also referred to as memory, e.g., corresponding to device readable medium 2080 of FIG. 20 and/or memory 2290 of FIG. 22) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the secondary node 902 may be performed by processing circuitry 1003, network interface 1007, and/or transceiver 1001. For example, processing circuitry 1003 may control transceiver 1001 to transmit downlink communications through transceiver 1001 over a radio interface to one or more mobile terminals UEs and/or to receive uplink communications through transceiver 1001 from one or more mobile terminals UEs over a radio interface. Similarly, processing circuitry 1003 may control network interface 1007 to transmit communications through network interface 1007 to one or more other network nodes and/or to receive communications through network interface from one or more other network nodes. Moreover, modules may be stored in memory 1005, and these modules may provide instructions so that when instructions of a module are executed by processing circuitry 1003, processing circuitry 1003 performs respective operations (e.g., operations discussed below with respect to Example Embodiments relating to secondary nodes 902). According to some embodiments, secondary node 902 and/or an element(s)/function(s) thereof may be embodied as a virtual node/nodes and/or a virtual machine/machines.

Figure 11:
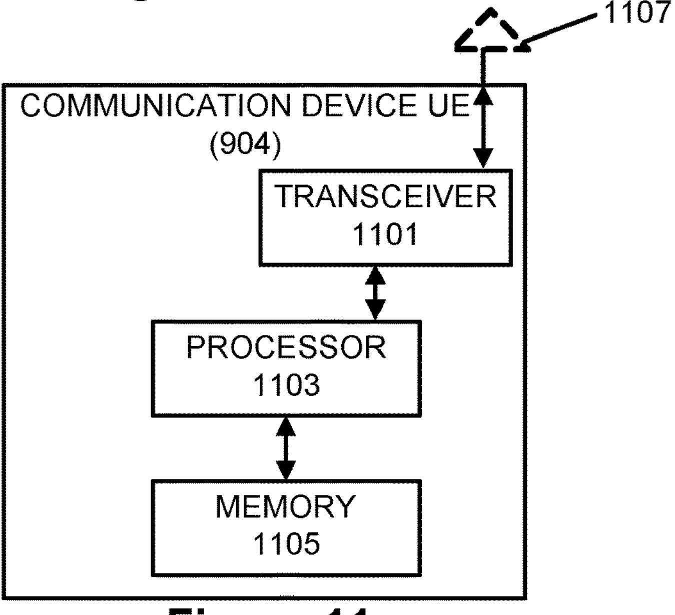
FIG. 11 is a block diagram illustrating a wireless device UE according to some embodiments of inventive concepts.

FIG. 11 is a block diagram illustrating elements of a UE 904 (also referred to as a mobile terminal, a mobile communication terminal, a communication device UE, a wireless device, a wireless communication device, a wireless terminal, mobile device, a wireless communication terminal, user equipment, UE, a user equipment node/terminal/device, etc.) configured to provide wireless communication according to embodiments of inventive concepts. (UE 904 may be provided, for example, as discussed below with respect to wireless device 2010 of FIG. 20, UE 4200 of FIG. 21, virtualization hardware 2230 and virtual machine 2240 of FIG. 22, UEs 2391, 2392 of FIG. 23, and UE 2430 of FIG. 24, all of which should be considered interchangeable in the examples and embodiments described herein and be within the intended scope of this disclosure, unless otherwise noted.) As shown, UE 904 may include an antenna 1107 (e.g., corresponding to antenna 2011 of FIG. 20 and/or antenna 22225 of FIG. 22), and transceiver circuitry 1101 (also referred to as a transceiver, e.g., corresponding to interface 2014 of FIG. 20, interfaces 2105, 2109, 2111, transmitter 2133 and receiver 2135 of FIG. 21, transmitter 22210 and receiver 22220 of FIG. 22, and radio interface 2437 of FIG. 24) including a transmitter and a receiver configured to provide uplink and downlink radio communications with a base station(s) (e.g., corresponding to network node 2060 of FIG. 20, also referred to as a RAN node) of a radio access network. UE 904 may also include processing circuitry 1103 (also referred to as a processor, e.g., corresponding to processing circuitry 2020 of FIG. 20, processor 2101 of FIG. 21, processing circuitry 2260 of FIG. 22, and processing circuitry 2438 of FIG. 24) coupled to the transceiver circuitry, and memory circuitry 1105 (also referred to as memory, e.g., corresponding to device readable medium 2030 of FIG. 20 and/or memory 2290 of FIG. 22) coupled to the processing circuitry. The memory circuitry 1105 may include computer readable program code that when executed by the processing circuitry 1103 causes the processing circuitry to perform operations according to embodiments disclosed herein. According to other embodiments, processing circuitry 1103 may be defined to include memory so that separate memory circuitry is not required. UE 904 may also include an interface (such as a user interface) coupled with processing circuitry 1103, and/or UE 904 may be incorporated in a vehicle.

As discussed herein, operations of UE 904 may be performed by processing circuitry 1103 and/or transceiver circuitry 1101. For example, processing circuitry 1103 may control transceiver circuitry 1101 to transmit communications through transceiver circuitry 1101 over a radio interface to a master radio access network node (also referred to as a master node, or a base station) and/or to receive communications through transceiver circuitry 1107 from a master node over a radio interface. Moreover, modules may be stored in memory circuitry 1105, and these modules may provide instructions so that when instructions of a module are executed by processing circuitry 1103, processing circuitry 1103 performs respective operations (e.g., operations discussed below with respect to Example Embodiments relating to wireless communication devices). According to some embodiments, a UE 904 and/or an element(s)/function (s) thereof may be embodied as a virtual node/nodes and/or a virtual machine/machines.

MN Initiated SCG (De)Activation, MN Decides

Figure 12:
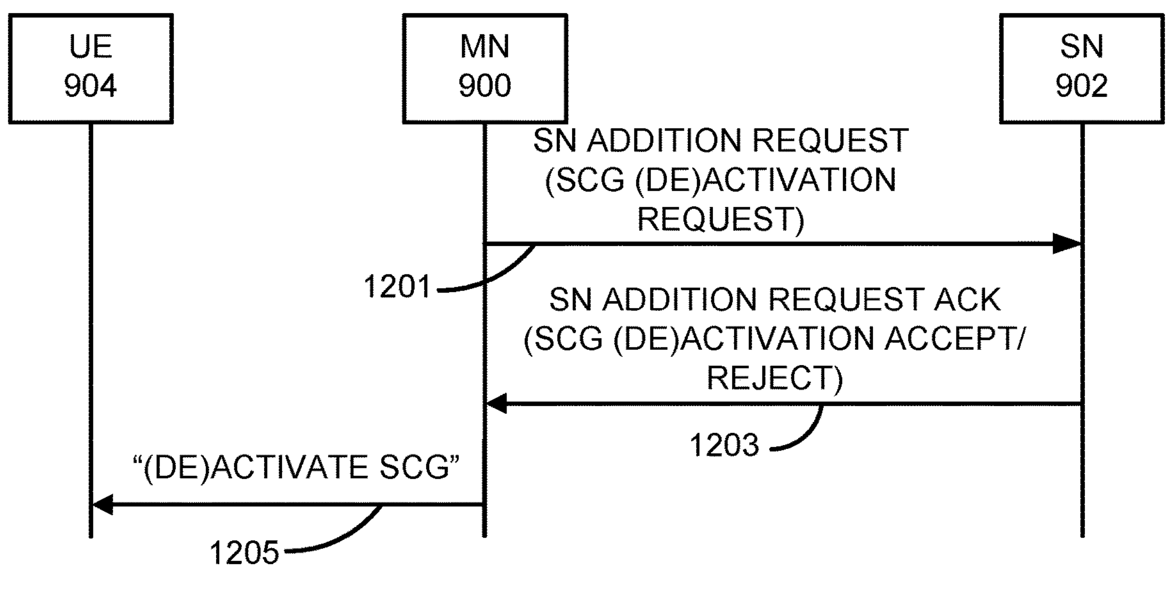
FIG. 12 is a block diagram illustrating a master node (e.g., a master base station MeNB/gNB) according to some embodiments of inventive concepts.

FIG. 12 illustrates a signaling diagram of embodiments where the MN initiates SCG activation and/or deactivation where the MN requests a certain SCG mode of operation to the SN. The MN 900 determines to add a Secondary cell group (SCG) configuration (e.g. based on measurement reports received from the UE and/or further input like traffic demands) and determines a mode of operation of the SCG e.g. activated or deactivated.

In operation 1201, the MN 900 initiates transmission of a SN addition request (also referred to as a SCG (de)activation request) to a secondary node 902 to add an activated SCG and/or a deactivated SCG. The request may be in the form of a S-NG-RAN NODE ADDITION REQUEST with an indication of activated SCG or deactivated SCG.

In operation 1203, the SN 902 initiates transmission of a SN addition request acknowledgement message (also referred to as a SCG (de)activation accept/reject message) to the MN 900. The acknowledgement message indicates whether the request has been accepted and the mode of operation of the SCG. The acknowledgement message may be in the form of a S-NG-RAN NODE ADDITION ACKNOWLEDGE message.

In operation 1205, the MN 900 initiates transmission to the UE 904 of a (de)activate SCG message including an SCG configuration to be added (e.g. nr-scg) and an indication of the SCG's mode of operation e.g. activated SCG or deactivated SCG.

FIG. 14 illustrates operations of FIG. 12 from the perspective of the MN 900. In the description that follows, while the master node may be any of the master node 900, the network node 2060, base stations 2312, the host computer 2330, or the base station 2420, the master node 900 shall be used to describe the functionality of the operations of the network node. Operations of the master node 900 (implemented using the structure of FIG. 9) will now be discussed with reference to the flow chart of FIG. 14 according to some embodiments of inventive concepts. For example, modules may be stored in memory 905 of FIG. 9, and these modules may provide instructions so that when the instructions of a module are executed by respective master node processing circuitry 903, MN 900 performs respective operations of the flow chart.

Turning to FIG. 14, in block 1401, the MN 900 determines to add the deactivated SCG configuration or the activated SCG configuration and a mode of operation of the SCG. The determining can be based on measurement reports received from the UE and/or further input like traffic demands and the like. The mode of operation may be an activated mode or a deactivated mode. Various operations from the flow chart of FIG. 14 may be optional with respect to some embodiments of Master Nodes and related methods. Regarding methods of example embodiment 1 (set forth below), for example, operations of block 1401 of FIG. 14 may be optional.

In block 1403, the MN 900 initiates transmission of a request to a secondary node (SN) 902, 2312*a*, 2312*b*, 2312*c*, 2230, 2240, 2420 (hereafter SN 902) to add the deactivated SCG configuration or the activated SCG configuration. The request includes an indication of the mode of operation for the SCG that the MN wants to configure the UE with (e.g. deactivated SCG or activated SCG).

In one variant of embodiments, the request to the SN 902 includes a request to add an SCG in activated mode of operation. In another variant of embodiments, the request to the SN includes a request to add an SCG in deactivated mode of operation.

The request in some embodiments is a S-NG-RAN NODE ADDITION REQUEST with an indication of activated SCG or deactivated SCG.

In block 1405, the MN 900 receives a response from the SN 902.

In some embodiments, the response indicates that the SCG is accepted and the SCG is added activated. In one of these embodiments, the SN 902 accepts the SCG addition and accepts the requested mode of operation as requested by the MN 900 to be activated. The acceptance may be indicated by the MN 900 receiving an acknowledge message, e.g. an S-NG-RAN NODE ADDITION ACKNOWLEDGE message with the absence of an indication, or the inclusion of an indication of the target mode of SCG operation e.g. mode=activated.

In another one of these embodiments, the SN 902 accepts the SCG addition but does not accept the requested mode of operation to be deactivated i.e. it only accepts it to be activated. The rejection of requested mode of operation (which could be called an SCG state or SCG activation state) may be indicated by the MN 900 receiving an acknowledge message with the absence of an indication, or the inclusion of an indication of the target mode of SCG operation e.g. mode=activated. Thus, in this case, the SN 902 partially accepts the SN addition request as it does accept the SCG addition, but with a different mode of SCG operation. This is equivalent to the SN accepting an SN addition (for SCG configuration at the UE) but not accepting the requested mode of SCG operation, i.e., it suggests a different mode of SCG operation.

In another one of these embodiments, the response from the SN 902 includes a container to be transmitted to the UE 904, such as an RRC container with an SCG RRCReconfiguration including an indication to the UE 904 that the SCG to be added is to be in activated mode of operation. That message also includes a Reconfiguration with Sync comprising i) ServingCellConfigCommon, including among other parameters a random access configuration (e.g. for contention based random access upon addition of an activated SCG), C-RNTI (Cell Radio Network Temporary Identifier) for the MAC SCG, timer T304 value, SMTC (SSB Measurement Timing Configuration), a contention free random access configuration (e.g. including CSI-RS (channel state information reference signal) configuration and/or SSB (Synchronization Signal Block) configuration for random access resource selection).

In a variation of the above embodiments, the MN 900 does not need to set any indication in an RRC Reconfiguration to the UE 904 to indicate to the UE 904 that the SCG to be added is to be considered in the activated (or deactivated) mode of operation, as that is done by the indication within the SCG RRCReconfiguration, as set by the SN. In one example that can be done within CellGroupConfig for the SCG, as part of the SCG RRC Reconfiguration set by the SN. The ASN.1 structure could be as follows:

```
-- Configuration of one Cell-Group:
CellGroupConfig ::=                    SEQUENCE {
  cellGroupId                          ,
[...]
  cellGroupMode
     ENUMERATED {activated, deactivated}   OPTIONAL, -- Need M
}
```

One advantage of encoding this that way i.e. adding a field in cell group config, is that it can also work in case network wants to deactivate the MCG.

In one variant, the response from the SN 902 includes an indication (as part of an Xn AP message that is to be understood and/or processed by the MN 900) that the SCG to be added is to be in activated (or deactivated) mode of operation. Upon reception the MN 900 is made aware that the SN 902 has determined the mode of operation to be activated (or deactivated).

In some further embodiments, the response indicates that the SCG is accepted and the SCG is added deactivated. In one of these embodiments, the SN 902 accepts the SCG addition and accepts the requested mode of operation as requested by the MN 900 to be deactivated. The acceptance may be indicated by the MN 900 receiving an acknowledge message, e.g. an S-NG-RAN NODE ADDITION ACKNOWLEDGE message with the absence of an indication, or the inclusion of an indication of the target mode of SCG operation e.g. mode=deactivated.

In an alternative of these further embodiments, the SN 902 accepts the SCG addition but does not accept the requested mode of operation to be activated i.e. it only accepts it to be deactivated. The rejection of requested mode of operation (which could be called an SCG state or SCG activation state) may be indicated by the MN 900 receiving an acknowledge message with the absence of an indication, or the inclusion of an indication of the target mode of operation e.g. mode=deactivated. In this case, the SN 902 partially accepts the SN addition request as it does accept but with a different mode of operation. This is equivalent to the SN 902 accepting an SN addition (for SCG configuration at the UE 904) but it does not accept the requested mode of operation, i.e., it suggests a different one.

In one variant, the response from the SN includes a container to be transmitted to the UE, such as an RRC container with an SCG RRCReconfiguration including an indication to the UE that the SCG to be added is to be in activated or deactivated mode of operation; That message also includes a Reconfiguration with Sync comprising i) ServingCellConfigCommon, including among other parameters a random access configuration (e.g. for contention based random access upon addition of a deactivated SCG (or an activated SCG), C-RNTI for the MAC SCG, timer T304 value, SMTC, a contention free random access configuration (e.g. including CSI-RS configuration and/or SSB configuration for random access resource selection).

In one variant, the MN 900 does not need to set any indication in an RRC Reconfiguration to the UE 904 to indicate to the UE 904 that the SCG to be added is to be considered in the deactivated (or activated) mode of operation, as that is done by the indication within the SCG RRCReconfiguration, as set by the SN 902. In one example that can be done within CellGroupConfig for the SCG, as part of the SCG RRC Reconfiguration set by the SN 902. The ASN.1 structure could be as follows:

```
-- Configuration of one Cell-Group:
CellGroupConfig ::=                    SEQUENCE {
  cellGroupId                          CellGroupId,
[...]
  cellGroupMode
     ENUMERATED {activated, deactivated}   OPTIONAL, -- Need M
}
```

As previously indicated, one advantage of encoding this that way i.e. adding a field in cell group config, is that it can also work in case network wants to activate the MCG.

In one variant the response from the SN 902 includes an indication (as part of an Xn AP message that is to be understood and/or processed by the MN 900) that the SCG to be added is to be in deactivated (or activated) mode of operation. Upon reception the MN 900 is made aware that the SN has determined the mode of operation to be deactivated (or activated).

In some other embodiments of inventive concepts, the response from SN 902 indicates the addition of the SCG is rejected. This response may be in the form of a S-NG-RAN NODE ADDITION REJECT message, where the reason for the rejection may be that the SCG mode of operation could not be fulfilled. This indication could be indicated by a new cause value in the message. For example, the indication could be implemented as follows in TS 38.423, chapter 9.2.3.2:

| | |
|---|---|
| Requested SCG mode not available | The action failed because the requested SCG mode of operation could not be fulfilled. |

In block 1407, the MN 900, responsive to the response indicating an acceptance of the SCG request, initiates transmission to a user equipment, UE, of a message including an SCG configuration to be added and an indication of a mode of operation of the SCG configuration (e.g., activated SCG or deactivated SCG.

In one variant, the message is generated by the MN 900 and the indication of the SCG's mode of operation is set by the MN 900.

In one variant, the message is generated by the MN 900 and the indication of the SCG's mode of operation is set by the SN 902. In one variant, the SCG mode of operation is set by the SN 902 within a part of the message containing the SCG configuration generated by the SN 902.

In one embodiment, the MN 900 sets a parameter indication in an RRCReconfiguration message to the UE 904 to indicate to the UE 904 that the SCG to be added is to be considered in the activated or deactivated mode of operation. The message the UE 904 receives is in the MN format and includes an SCG RRC Reconfiguration in a container (e.g. nr-scg). One example is shown below for the message in MN format (generated by the MN 900), except for the container (that is in SN format and generated by the SN 902). In terms of ASN.1 this is how the structure would look like:

```
RRCReconfiguration-v1560-IEs ::=              SEQUENCE {
  mrdc-SecondaryCellGroupConfig                  SetupRelease { MRDC-
SecondaryCellGroupConfig }               OPTIONAL, -- Need M
  radioBearerConfig2                            OCTET STRING (CONTAINING
RadioBearerConfig)                     OPTIONAL, -- Need M
  sk-Counter                                SK-Counter            OPTIONAL, --
Need N
  mode-SCG                                                      ENUMERATED
{activated, deactivated}                   OPTIONAL, -- Need M
  nonCriticalExtension                         RRCReconfiguration-v1610-IEs
OPTIONAL
}
```

In one example, the MN 900 would set the parameter indicating the mode of operation e.g. mode-SCG to 'activated' or 'deactivated.'

In the case where the MN 900 received the reject message, the MN 900 does not initiate the transmission of a message to send to the UE 904.

FIG. 15 illustrates operations of FIG. 12 from the perspective of the SN 902. In the description that follows, while the secondary node may be any of the secondary node 902, the network node 2060, base stations 2312, the host computer 2330, or the base station 2420, the secondary node 902 shall be used to describe the functionality of the operations of the network node. Operations of the secondary node 902 (implemented using the structure of FIG. 10) will now be discussed with reference to the flow chart of FIG. 15 according to some embodiments of inventive concepts. For example, modules may be stored in memory 1005 of FIG. 10, and these modules may provide instructions so that when the instructions of a module are executed by respective secondary node processing circuitry 1003, SN 902 performs respective operations of the flow chart.

Turning to FIG. 15, in block 1501, the SN 902 receives a request from a master node 900, 2312*a*, 2312*b*, 2312*c*, 2230, 2240, 2420 (MN) (hereafter MN 900) to add a deactivated secondary cell group (SCG) configuration or an active SCG configuration.

In block 1503, the SN 902 initiates transmission of a response to the MN 900, wherein the response comprises one of:

acceptance of adding the SCG where the SCG is added activated; or acceptance of adding the SCG where the SCG is added deactivated; or rejection of the addition of the SCG.

The embodiments where the SCG is added activated or added deactivated are described above. The embodiments where the rejection of the addition of the SCG is transmitted is also described above.

FIG. 16 illustrates operations of FIG. 9 from the perspective of the UE 904.

In the description that follows, while the UE may be any of the UE 904, wireless device 2010, the UE 2100, UEs 2391, 2392, or UE 2430, the UE 904 shall be used to describe the functionality of the operations of the UE. Operations of the UE 904 (implemented using the structure of the block diagram of FIG. 11) will now be discussed with reference to the flow chart of FIG. 16 according to some embodiments of inventive concepts. For example, modules may be stored in memory 1105 of FIG. 11, and these modules may provide instructions so that when the instructions of a module are executed by respective communication device processing circuitry 1103, UE 904 performs respective operations of the flow chart.

Turning to FIG. 16, in block 1601, the UE 904 receives a request from a master node 900, 2312*a*, 2312*b*, 2312*c*, 2230, 2240, 2420 (MN) including an secondary cell group, SCG, configuration and an indication of a mode of operation of the SCG.

In block 1603, the UE 904 determines the mode of operation of the SCG based on the indication of the mode of operation of the SCG.

In block 1605, the UE 904 determines whether to perform random access or delay performing rando access based on the determined mode of operation of the SCG.

In block 1605, the UE 904 applies the SCG configuration in accordance with the determined mode of operation of the SCG.

In some embodiments, the request includes a reconfiguration with sync comprising a ServingCellConfigCommon information element IE including a random access procedure. In some of these embodiments, applying the SCG configuration includes applying the SCG configuration to operate in a deactivated mode of operation responsive to the mode of operation in the request indicating a deactivated mode of operation wherein the UE 904 stores the ServingCellConfigCommon IE and applies the ServingCellConfigCommon IE upon reception of receiving a command to activate the SCG upon which the UE starts timer T304 and performs random access.

In these embodiments, the UE 904 applies the SCG configuration (and RRC Reconfiguration) where the request includes an indication to the UE 904 that the SCG to be added is to operate in deactivated mode of operation. That message does not have to contain all parameters typically contained in a Reconfiguration with Sync and does not perform random access upon addition of an SCG in deactivated mode of operation. Instead, at least one of these parameters are expected to be received later in the activation command for the SCG, comprising i) ServingCellConfigCommon, including among other parameters some random access configuration (e.g. for contention based random access upon addition of an activated SCG), C-RNTI for the MAC SCG, timer T304 value, SMTC, a contention free random access configuration (e.g. including CSI-RS configuration and/or SSB configuration for random access resource selection). Upon reception the UE 904 applies the message, starts timer T304 and performs random access (to establish beam alignment and obtain timing advance);

In other of these embodiments, applying the SCG configuration includes applying the SCG configuration to operate in a activated mode of operation responsive to the mode of operation in the request indicating a activated mode of operation wherein the UE 904 applies the ServingCellConfigCommon IE and starts timer T304 and performs random access.

In the other of these embodiments, the UE 904 applies the SCG configuration (and RRC Reconfiguration) where the request includes an indication to the UE 904 that the SCG to be added is to operate in activated mode of operation. That message also includes a Reconfiguration with Sync comprising i) ServingCellConfigCommon, including among other parameters some random access configuration (e.g. for contention based random access upon addition of an activated SCG), C-RNTI for the MAC SCG, timer T304 value, SMTC, a contention free random access configuration (e.g. including CSI-RS configuration and/or SSB configuration for random access resource selection). Upon reception the UE 904 applies the message, starts timer T304 and performs random access.

Example implementation in TS 38.423 is illustrated below:

8.3.1.2 Successful Operation

If the S-NODE ADDITION REQUEST message contains the SCG State Change Request IE, the S-NG-RAN node shall include the SCG State Change Response IE in the S-NODE ADDITION REQUEST ACKNOWLEDGE message to inform the M-NG-RAN node if the S-NG-RAN node accepts or rejects the SCG state change request as specified in TS 37.340 [8].

9.1.2.1 S-Node Addition Request

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description | Criticality | Assigned Criticality |
|---|---|---|---|---|---|---|
| SCG State Change Request | O | | ENUMERATED (activate, deactivate, . . .) | Indicates request for activate or deactivate SCG. | YES | ignore |

9.1.2.2 S-Node Addition Request Acknowledge

This message is sent by the S-NG-RAN node to confirm the M-NG-RAN node about the S-NG-RAN node addition preparation.

Direction: S-NG-RAN node→M-NG-RAN node.

| IE/Group Name | Presence | Range | IE type and reference | Semantics description | Criticality | Assigned Criticality |
|---|---|---|---|---|---|---|
| SCG State Change Response | O | | ENUMERATED (accept, reject, . . .) | Indicates that the SCG state change request is accepted or rejected. | YES | ignore |

Example implementation in TS 38.331:

One example implementation was shown in the description above and this example shows a variant of an implementation where only deactivated SCG is indicated and absence of the parameter means that the SCG is activated.

5.3.5.3 Reception of an RRCReconfiguration by the UE

The UE shall perform the following actions upon reception of the RRCReconfiguration, or upon execution of the conditional reconfiguration (CHO or CPC):

1> if the RRCReconfiguration message includes the deactivatedSCG:

2> consider the SCG to be deactivated;

6.2.2 Message Definitions

[ . . . ]

RRCReconfiguration

The RRCReconfiguration message is the command to modify an RRC connection. It may convey information for measurement configuration, mobility control, radio resource configuration (including RBs, MAC main configuration and physical channel configuration) and AS security configuration.

Signalling radio bearer: SRB1 or SRB3

RLC-SAP: AM

Logical channel: DCCH

Direction: Network to UE

RRCReconfiguration Message

```
ASN1START
-- TAG-RRCRECONFIGURATION-START
...
RRCReconfiguration-v17xy-IEs ::=        SEQUENCE {
  deactivatedSCG-v17xy                  BOOLEAN        OPTIONAL,
-- Need M
  nonCriticalExtension                  RRCReconfiguration-v17xy-IEs
OPTIONAL
}
...
-- TAG-RRCRECONFIGURATION-STOP
-- ASN1STOP
```

| RRCReconfiguration-IEs field descriptions |
| --- |
| deactivatedSCG<br>Indicates to the UE that the SCG shall be deactivated. |

MN Initiated SCG (De)Activation, SN Decides

Figure 13:
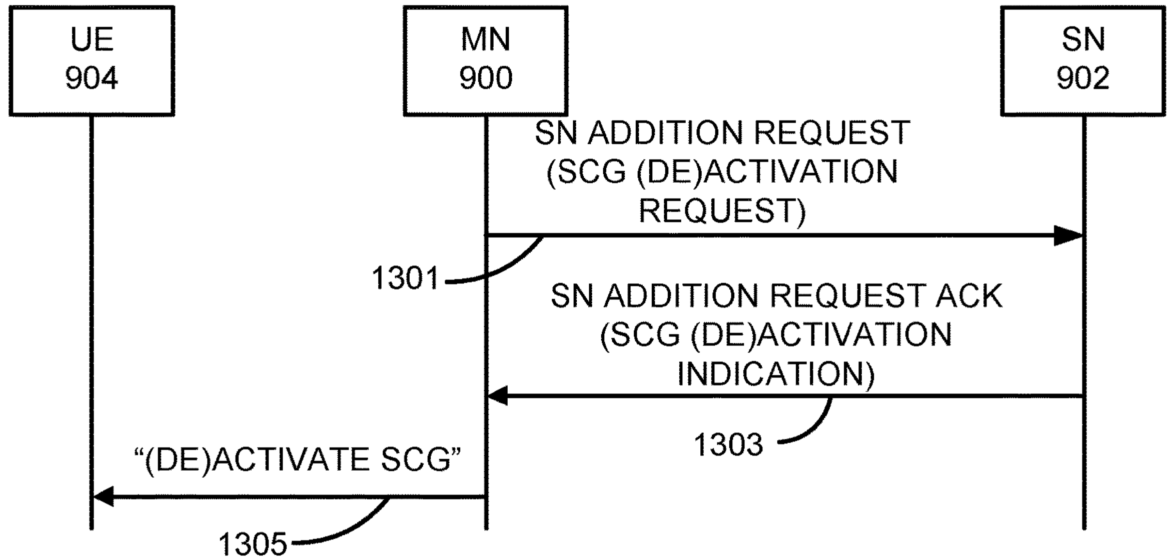
FIG. 13 is a block diagram illustrating a secondary node (e.g., a secondary base station SeNB/gNB) according to some embodiments of inventive concepts.

FIG. 13 illustrates a signaling diagram of embodiments where the MN 900 initiates SCG activation and/or deactivation where the SN 902 indicates the SCG mode of operation to the MN 900. Thus, the SN 902 decides the mode of operation of the SCG. The MN 900 determines to add a Secondary cell group (SCG) configuration (e.g. based on measurement reports received from the UE and/or further input like traffic demands).

In operation 1301, the MN 900 initiates transmission of a SN addition request (also referred to as a SCG (de)activation request) to a secondary node 902 to add an activated SCG and/or a deactivated SCG and to determine an operation mode of the SCG. The request may be in the form of a S-NG-RAN NODE ADDITION REQUEST with a request to the SN 902 to determine the SCG mode of operation (e.g., activated SCG or deactivated SCG).

In operation 1303, the SN 902 initiates transmission of a SN addition request acknowledgement message (also referred to as a SCG (de)activation indication) to the MN 900. The acknowledgement message indicates whether the request has been accepted and the mode of operation of the SCG indicated. The acknowledgement message may be in the form of a S-NG-RAN NODE ADDITION ACKNOWLEDGE message.

In operation 1305, the MN 900 initiates transmission to the UE 904 of a (de)activate SCG message including an SCG configuration to be added (e.g. nr-scg) and an indication of a mode of operation of the SCG (e.g. activated SCG or deactivated SCG).

Figure 17:
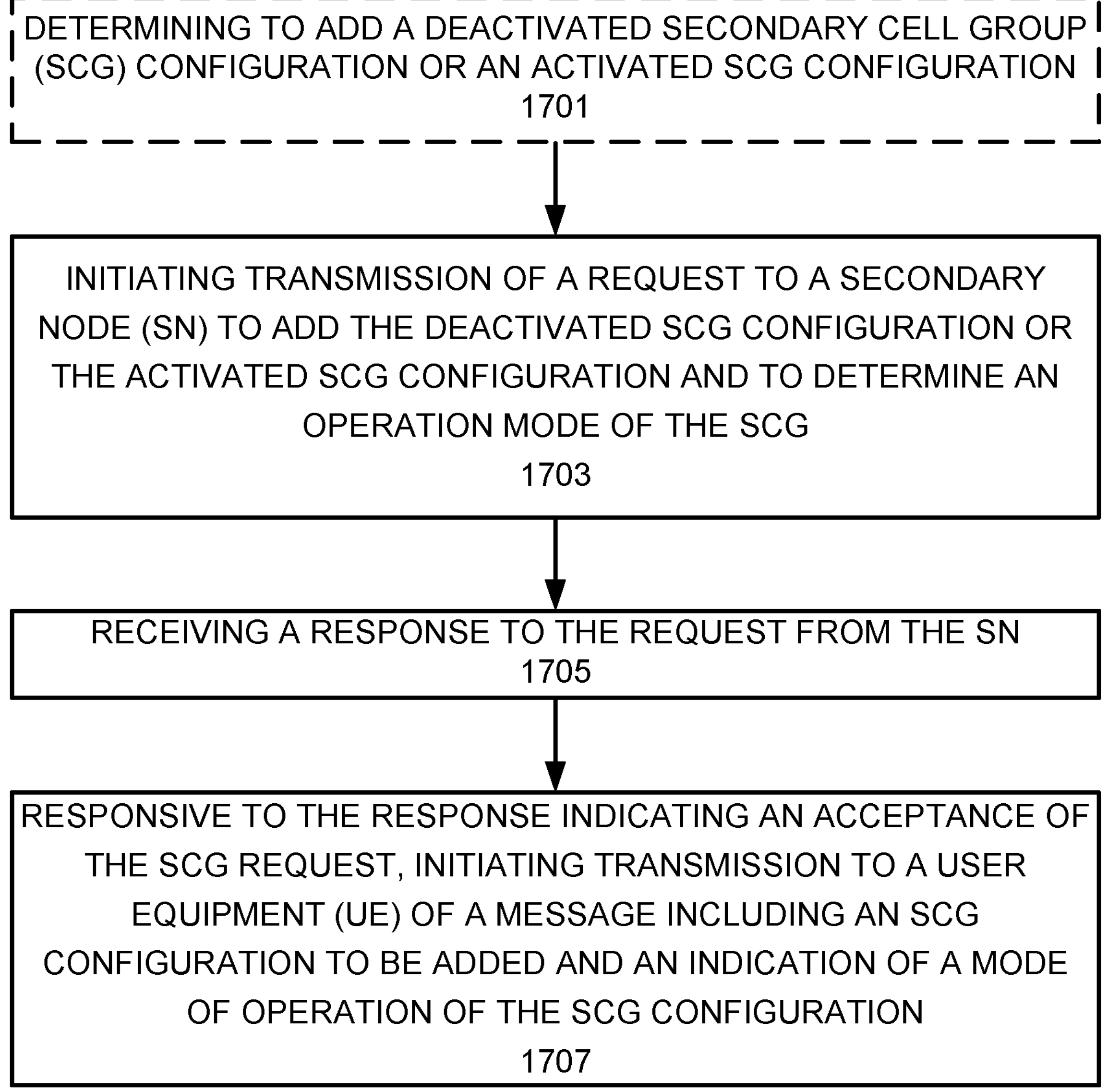
FIG. 17 is a flow chart illustrating operations of a master node according to some embodiments of inventive concepts.

FIG. 17 illustrates operations of FIG. 13 from the perspective of the MN 900. In the description that follows, while the master node may be any of the master node 900, the network node 2060, base stations 2312, the host computer 2330, or the base station 2420, the master node 900 shall be used to describe the functionality of the operations of the network node. Operations of the master node 900 (implemented using the structure of FIG. 9) will now be discussed with reference to the flow chart of FIG. 14 according to some embodiments of inventive concepts. For example, modules may be stored in memory 905 of FIG. 9, and these modules may provide instructions so that when the instructions of a module are executed by respective master node processing circuitry 903, MN 900 performs respective operations of the flow chart.

Turning to FIG. 17, in block 1701, the MN 900 determines to add an SCG configuration. The determining may be based on measurement reports received from the UE 904 and/or further input such as traffic demands. Regarding methods of example embodiment 17 (set forth below), operations of block 1701 of FIG. 17 may be optional.

In block 1703, the MN 900 initiates transmission of a request to a secondary node (902, 2312A, 2312B, 2312C, 2230, 2240, 2420), SN, to add a secondary cell group, SCG, configuration and to determine an operation mode of the SCG.

In some embodiments, the request is an S-NG NODE ADDITION REQUEST with a request to the SN 902 to determine the SCG mode of operation. The request in some embodiments may include an indication of the mode of operation for the SCG that the MN 900 would like, e.g. deactivated SCG or activated SCG.

In block 1705, the MN 900 receives a response from the SN 902. In some embodiments, the response from the SN 902 indicates the addition of the SCG is accepted with the SCG mode of operation indicated.

In some embodiments, the response is an S-NG-RAN NODE ADDITION ACKNOWLEDGE message with an indication of the target mode of SCG operation (e.g., activated SCG or deactivated SCG).

In one alternative of these embodiments, the SN 904 accepts the SCG addition and determines the mode of operation to be activated. The acceptance may be indicated by the MN 900 receiving an acknowledge message with the absence of an indication, or the inclusion of an indication of the target mode of SCG operation e.g. mode=activated.

In another alternative of these embodiments, the SN 904 accepts the SCG addition and determines the mode of operation to be deactivated. The deactivated mode may be indicated by the MN 900 receiving an acknowledge message with the absence of an indication, or the inclusion of an indication of the target mode of SCG operation e.g. mode=deactivated.

In one variant of these embodiments, the response from the SN 902 includes a container to be transmitted to the UE 904, such as an RRC container with an SCG RRC Reconfiguration including an indication to the UE 904 that the SCG to be added is to be in activated or deactivated mode of operation. The message can also include a Reconfiguration with Sync comprising i) ServingCellConfigCommon, including among other parameters a random access configuration (e.g. for contention based random access upon addition of an activated or deactivated SCG), C-RNTI for the MAC SCG, timer T304 value, SMTC, a contention free random access configuration (e.g. including CSI-RS configuration and/or SSB configuration for random access resource selection).

In one variant of these embodiments, the MN 900 does not need to set any indication in an RRC Reconfiguration to the UE 904 to indicate to the UE 904 that the SCG to be added is to be considered in the activated/deactivated mode of operation, as that is done by the indication within the SCG RRC Reconfiguration, as set by the SN 902. In one example that can be done within CellGroupConfig for the SCG, as part of the SCG RRC Reconfiguration set by the SN 902. The ASN.1 structure could be as follows:

```
-- Configuration of one Cell-Group:
CellGroupConfig ::=                 SEQUENCE {
  cellGroupId                       CellGroupId,
[...]
  cellGroupMode
    ENUMERATED {activated, deactivated}    OPTIONAL, -- Need M
}
```

One advantage of encoding this that way i.e. adding a field in cell group config, is that it can also work in case network wants to deactivate the MCG.

In one variant, the response from the SN 902 includes an indication (as part of an Xn AP message that is to be understood and/or processed by the MN 900) that the SCG to be added is to be in activated or deactivated mode of operation. Upon reception the MN 900 is made aware that the SN 902 has determined the mode of operation to be activated or deactivated.

In some embodiments, the response received from the SN 902 indicates that the addition of the SCG is rejected. The response may be in the form of an S-NG-RAN NODE ADDITION REJECT message, where the reason for the rejection is that the SCG mode of operation could not be determined. Possibly this could be indicated by a new cause value in the message, e.g. implemented like this in TS 38.423, chapter 9.2.3.2:

| | |
|---|---|
| SCG mode not determined | The action failed because the SCG mode of operation could not be determined. |

In block 1707, the MN 900, responsive to the response indicating an acceptance of the SCG request, initiates transmission to a user equipment (UE) of a message including an SCG configuration to be added and an indication of a mode of operation of the SCG configuration.

In some embodiments, the message is generated by the MN 900 and the indication of the SCG's mode of operation determined by the SN 902 is set by the MN 900.

In one variant of these embodiments, the MN 900 sets a parameter indication in an RRCReconfiguration message to the UE to indicate to the UE that the SCG to be added is to be considered in the activated or deactivated mode of operation. The message the UE 904 receives is in the MN format and includes an SCG RRC Reconfiguration in a container (e.g. nr-scg). One example is shown below for the message in MN format (generated by the MN 900), except for the container (that is in SN format and generated by the SN 902). In terms of ASN.1 this is how the structure would look like:

```
RRCReconfiguration-v1560-IEs ::=              SEQUENCE {
  mrdc-SecondaryCellGroupConfig                 SetupRelease { MRDC-
SecondaryCellGroupConfig }                  OPTIONAL,   -- Need M
  radioBearerConfig2                           OCTET STRING (CONTAINING
RadioBearerConfig)                        OPTIONAL,   -- Need M
  sk-Counter                                  SK-Counter          OPTIONAL, --
Need N
  mode-SCG                                                        ENUMERATED
{activated, deactivated}                    OPTIONAL, -- Need M
  nonCriticalExtension                         RRCReconfiguration-v1610-IEs
OPTIONAL
}
```

In one example, the MN 900 would set the parameter indicating the mode of operation e.g. mode-SCG to 'activated'. In another example the MN 900 would set the parameter to 'deactivated'.

FIG. 18 illustrates operations of FIG. 13 from the perspective of the SN 902. In the description that follows, while the secondary node may be any of the secondary node 902, the network node 2060, base stations 2312, the host computer 2330, or the base station 2420, the secondary node 902 shall be used to describe the functionality of the operations of the network node. Operations of the secondary node 902 (implemented using the structure of FIG. 10) will now be discussed with reference to the flow chart of FIG. 18 according to some embodiments of inventive concepts. For example, modules may be stored in memory 1005 of FIG. 10, and these modules may provide instructions so that when the instructions of a module are executed by respective secondary node processing circuitry 1003, SN 902 performs respective operations of the flow chart.

Turning to FIG. 18, in block 1801, the SN 902 receives a request from a master node 900, 2312A, 2312B, 2312C, 2230, 2240, 2420 (MN) (hereafter MN 900) to add a deactivated secondary cell group (SCG) configuration or an activated SCG configuration and to determine a mode of operation of the SCG.

In block 1803, the SN 902 initiates transmission of a response to the MN 900, wherein the response comprises one of:

acceptance of adding the SCG where the SCG is added activated; or acceptance of adding the SCG where the SCG is added deactivated; or rejection of the addition of the SCG The embodiments where the SCG is added activated or added deactivated are described above. The embodiments where the rejection of the addition of the SCG is transmitted is also described above.

FIG. 19 illustrates operations of FIG. 13 from the perspective of the UE 904.

In the description that follows, while the UE may be any of the UE 904, wireless device 2010, the UE 2100, UEs 2391, 2392, or UE 2430, the UE 904 shall be used to describe the functionality of the operations of the UE. Operations of the UE 904 (implemented using the structure of the block diagram of FIG. 11) will now be discussed with reference to the flow chart of FIG. 19 according to some embodiments of inventive concepts. For example, modules may be stored in memory 1105 of FIG. 11, and these modules may provide instructions so that when the instructions of a module are executed by respective communication device processing circuitry 1103, UE 904 performs respective operations of the flow chart.

Turning to FIG. 19, in block 1901, the UE 904 receives a request from a master node 900, 2312A, 2312B, 2312*c*, 2230, 2240, 2420 (MN) including an secondary cell group, SCG, configuration and a mode of operation of the SCG determined by a secondary node 902, 2312A, 2312B, 2312C, 2230, 2240, 2420 (SN).

In block 1903, the UE 904 applies the SCG configuration in accordance with the mode of operation of the SCG.

In some embodiments, the request includes a reconfiguration with sync comprising a ServingCellConfigCommon information element IE including a random access procedure. In some of these embodiments, applying the SCG configuration includes applying the SCG configuration to operate in a deactivated mode of operation responsive to the mode of operation in the request indicating a deactivated mode of operation wherein the UE 904 stores the ServingCellConfigCommon IE and applies the ServingCellConfigCommon IE upon reception of receiving a command to activate the SCG upon which the UE starts timer T304 and performs random access.

In these embodiments, the UE 904 applies the SCG configuration (and RRC Reconfiguration) where the request includes an indication to the UE 904 that the SCG to be added is to operate in deactivated mode of operation. That message does not have to contain all parameters typically contained in a Reconfiguration with Sync and does not perform random access upon addition of an SCG in deactivated mode of operation. Instead, at least one of these parameters are expected to be received later in the activation command for the SCG, comprising i) ServingCellConfigCommon, including among other parameters some random access configuration (e.g. for contention based random access upon addition of an activated SCG), C-RNTI for the MAC SCG, timer T304 value, SMTC, a contention free random access configuration (e.g. including CSI-RS configuration and/or SSB configuration for random access resource selection). Upon reception the UE 904 applies the message, starts timer T304 and performs random access (to establish beam alignment and obtain timing advance);

In other of these embodiments, applying the SCG configuration includes applying the SCG configuration to operate in an activated mode of operation responsive to the mode of operation in the request indicating a activated mode of operation, In some of these other of these embodiments, the UE 904 applies the ServingCellConfigCommon IE and starts timer T304 and performs random access.

In the other of these embodiments, the UE 904 applies the SCG configuration (and RRC Reconfiguration) where the request includes an indication to the UE 904 that the SCG to be added is to operate in activated mode of operation. That message also includes a Reconfiguration with Sync comprising i) ServingCellConfigCommon, including among other parameters some random access configuration (e.g. for contention based random access upon addition of an activated SCG), C-RNTI for the MAC SCG, timer T304 value, SMTC, a contention free random access configuration (e.g. including CSI-RS configuration and/or SSB configuration for random access resource selection). Upon reception the UE 904 applies the message, starts timer T304 and performs random access.

If it is adopted to the standard that both the MN 900 and the SN 902 can indicate whether the SCG is activated or deactivated to the UE 904, it needs to be clear what solution is used in which case. The MN 900 needs to know whether the SN 902 has included the indication to the UE 904 within the CG-Config, as otherwise the MN 900 needs to include it in the MN part of the RRC message. It could e.g. be specified in procedure text in TS 38.331, TS 38.423 or in stage 2 description 38.300, in which cases the SN 902 includes the indication, or in which cases in does not include it. It could also be indicated by other means, e.g. by configuration.

Example Implementation in 38.423:

8.3.1.2 Successful Operation

If the S-NODE ADDITION REQUEST message contains the SCG State Change Request IE, the S-NG-RAN node shall include the SCG State Indication IE in the S-NODE ADDITION REQUEST ACKNOWLEDGE message to inform the M-NG-RAN node about the SCG state in the S-NG-RAN node as specified in TS 37.340 [8].

9.1.2.1 S-Node Addition Request

This message is sent by the M-NG-RAN node to the S-NG-RAN node to request the preparation of resources for dual connectivity operation for a specific UE.

Direction: M-NG-RAN node→S-NG-RAN node.

| IE/Group Name | Presence | Range | IE type and reference | Semantics description | Criticality | Assigned Criticality |
|---|---|---|---|---|---|---|
| SCG State Change Request | O | | ENUMERATED (activate, deactivate, . . .) | Indicates request for activate or deactivate SCG. | YES | ignore |

9.1.2.2 S-Node Addition Request Acknowledge

This message is sent by the S-NG-RAN node to confirm the M-NG-RAN node about the S-NG-RAN node addition preparation.

Direction: S-NG-RAN node→M-NG-RAN node

| IE/Group Name | Presence | Range | IE type and reference | Semantics description | Criticality | Assigned Criticality |
|---|---|---|---|---|---|---|
| SCG State Indication | O | | ENUMERATED (activated, deactivated, . . .) | Indicates the SCG state in the SN. | YES | ignore |

TS 38.331

Example implementation was shown in the description above and here is a variant of an implementation. The indication of activated/deactivated SCG is in this embodiment not only sent in S-NG-RAN NODE ADDITION ACKNOWLEDGE, but it is also included in CG-Config, which is the SCG RRCReconfiguration built by the SN and forwarded to the UE by the MN. The MN in this solution does not have to indicate SCG (de)activation in the RRCReconfiguration message built by the MN.

The example implementation in 38.331 is similar to previous example implementation, but the deactivatedSCG indication is included in a different place in the RRCReconfiguration message. If the indication is included in CG-Config in the inter-node message, it will be part of the IE nr-SCG in the RRCReconfiguration message towards the UE.

Example embodiments are discussed below.

Embodiment 1. A method performed by a master node (900, 2312*a*, 2312*b*, 2312*c*, 2230, 2240, 2420), MN, comprising:

initiating transmission (1403) of a request to a secondary node (902, 2312*a*, 2312*b*, 2312*c*, 2230, 2240, 2420), SN, to add a deactivated secondary cell group, SCG, configuration or an activated SCG configuration;

receiving (1405) a response to the request from the SN;

responsive to the response indicating an acceptance of the SCG request, initiating transmission (1407) to a user equipment, UE, of a message including an SCG configuration to be added and an indication of a mode of operation of the SCG configuration.

Embodiment 2. The method of Embodiment 1, further comprising:

determining (1401) to add the deactivated SCG configuration or the activated SCG configuration and a mode of operation of the SCG prior to initiating transmission of the request to the SN.

Embodiment 3. The method of Embodiment 2, wherein determining to add the deactivated SCG configuration or the activated SCG configuration comprises determining to add the deactivated SCG configuration or the activated SCG configuration based on measurement reports received from the UE.

Embodiment 4. The method of any of Embodiments 1-3, wherein determining to add the deactivated SCG configuration or the activated SCG configuration comprises determining to add the deactivated SCG configuration.

Embodiment 5. The method of Embodiment 4, wherein transmitting the request to the SN comprises transmitting a request to add an SCG in a deactivated mode of operation.

Embodiment 6. The method of any of Embodiments 1-3, wherein determining to add the deactivated SCG configuration or the activated SCG configuration comprises determining to add the activated SCG configuration.

Embodiment 7. The method of Embodiment 6 wherein transmitting the request to the SN comprises transmitting a request to add an SCG in an activated mode of operation.

Embodiment 8. The method of any of Embodiments 1-7, wherein receiving the response comprises receiving a response from the SN indicating the addition of the SCG is accepted and the SCG is added activated.

Embodiment 9. The method of any of Embodiments 1-7, wherein receiving the response comprises receiving a response from the SN indicating the addition of the SCG is accepted and the SCG is added deactivated.

Embodiment 10. The method of any of Embodiments 1-7, wherein receiving the response comprises receiving a response from the SN indicating the addition of the SCG is accepted and the SCG is added according to a requested mode of operation to be activated.

Embodiment 11. The method of any of Embodiments 1-10 wherein receiving the response comprises receiving a container to be transmitted to the UE.

Embodiment 12. A method performed by a secondary node (902, 2312*a*, 2312*b*, 2312*c*, 2230, 2240, 2420), SN, comprising:

receiving (1501) a request from a master node (900, 2312*a*, 2312*b*, 2312*c*, 2230, 2240, 2420), MN, to add a deactivated secondary cell group, SCG, configuration or an active SCG configuration; and initiating (1503) transmission of a response to the MN, wherein the response comprises one of:

acceptance of adding the SCG where the SCG is added activated; or acceptance of adding the SCG where the SCG is added deactivated; or rejection of the addition of the SCG.

Embodiment 13. A method performed by a user equipment (904, 2100, 2391, 2392, 2430), UE, comprising:

receiving (1601) a request from a master node (900, 2312*a*, 2312*b*, 2312*c*, 2230, 2240, 2420), MN, including a secondary cell group, SCG, configuration and a mode of operation of the SCG; and applying (1603) the SCG configuration in accordance with the mode of operation of the SCG.

Embodiment 14. The method of Embodiment 13 wherein applying the SCG configuration comprises:

applying the SCG configuration to operate in an activated mode of operation responsive to the mode of operation in the request indicating an activated mode of operation.

Embodiment 15. The method of Embodiment 13 wherein the request includes a reconfiguration with sync comprising a ServingCellConfigCommon information element IE including a random access procedure, and applying the SCG configuration comprises: applying the SCG configuration to operate in a deactivated mode of operation responsive to the mode of operation in the request indicating a deactivated mode of operation wherein the UE stores the ServingCellConfigCommon IE and applies the ServingCellConfigCommon IE upon reception of receiving a command to activate the SCG upon which the UE starts timer T304 and performs random access.

Embodiment 16. The method of Embodiment 13 wherein the request includes a reconfiguration with sync comprising a ServingCellConfigCommon information element IE including a random access configuration, and applying the SCG configuration comprises: applying the SCG configuration to operate in a activated mode of operation responsive to the mode of operation in the request indicating a activated mode of operation wherein the UE applies the ServingCellConfigCommon IE and starts timer T304 and performs random access.

17. A method performed by a master node (900, 2312*a*, 2312*b*, 2312*c*, 2230, 2240, 2420), MN, comprising:

initiating (1703) transmission of a request to a secondary node (902, 2312*a*, 2312*b*, 2312*c*, 2230, 2240, 2420), SN, to add a secondary cell group, SCG, configuration and to determine an operation mode of the SCG;

receiving (1705) a response to the request from the SN (902, 2312*a*, 2312*b*, 2312*c*, 2230, 2240, 2420); and responsive to the response indicating an acceptance of the SCG request, initiating (1707) transmission to a user equipment (904, 2100, 2391, 2392, 2430), UE, of a message including an SCG configuration to be added and an indication of a mode of operation of the SCG configuration.

Embodiment 18. The method of Embodiment 17, further comprising determining (1701) to add the SCG configuration prior to initiating transmission of the request to the SN.

Embodiment 19. The method of Embodiment 18, wherein determining to add the SCG configuration comprises determining to add the SCG configuration based on measurement reports received from the UE.

Embodiment 20. The method of any of Embodiments 17-19, wherein receiving the response comprises receiving a response from the SN indicating the addition of the SCG is accepted and the SCG is added activated.

Embodiment 21. The method of any of Embodiments 17-19, wherein receiving the response comprises receiving a response from the SN indicating the addition of the SCG is accepted and the SCG is added deactivated.

Embodiment 22. The method of any of Embodiments 17-21, further comprising setting the indication of the mode of operation.

Embodiment 23. A method performed by a secondary node (902, 2312*a*, 2312*b*, 2312*c*, 2230, 2240, 2420), SN, comprising:

receiving (1801) a request from a master node (900, 2312*a*, 2312*b*, 2312*c*, 2230, 2240, 2420), MN, to add a secondary cell group, SCG, configuration and to determine a mode of operation of the SCG; and initiating (1803) transmission of a response to the MN, wherein the response comprises one of:

acceptance of adding the SCG where the SCG is added activated; or acceptance of adding the SCG where the SCG is added deactivated; or rejection of the addition of the SCG.

Embodiment 24. A method performed by a user equipment (904, 2100, 2391, 2392, 2430), UE, comprising:

receiving (1901) a request from a master node (900, 2312*a*, 2312*b*, 2312*c*, 2230, 2240, 2420), MN, including an secondary cell group, SCG, configuration and a mode of operation of the SCG determined by a secondary node, SN, (902, 2312*a*, 2312*b*, 2312*c*, 2230, 2240, 2420); and applying (1903) the SCG configuration in accordance with the mode of operation of the SCG.

Embodiment 25. The method of Embodiment 24 wherein applying the SCG configuration comprises:

applying the SCG configuration to operate in an activated mode of operation responsive to the mode of operation in the request indicating an activated mode of operation.

Embodiment 26. The method of Embodiment 24 wherein the request includes a reconfiguration with sync comprising a ServingCellConfigCommon information element IE including a random access procedure, and applying the SCG configuration comprises:

applying the SCG configuration to operate in a deactivated mode of operation responsive to the mode of operation in the request indicating a deactivated mode of operation wherein the UE stores the ServingCellConfigCommon IE and applies the ServingCellConfigCommon IE upon reception of receiving a command to activate the SCG upon which the UE starts timer T304 and performs random access.

Embodiment 27. The method of Embodiment 24 wherein the request includes a reconfiguration with sync comprising a ServingCellConfigCommon information element IE including a random access configuration, and applying the SCG configuration comprises:

applying the SCG configuration to operate in a activated mode of operation responsive to the mode of operation in the request indicating a activated mode of operation wherein the UE applies the ServingCellConfigCommon IE and starts timer T304 and performs random access.

Embodiment 28. A master node (900, 2312*a*, 2312*b*, 2312*c*, 2230, 2240, 2420), MN, comprising:

processing circuitry (903, 2070, 2260, 2428); and memory (905, 2080, 2290) coupled with the processing circuitry, wherein the memory includes instructions that when executed by the processing circuitry causes the MN to perform operations according to any of Embodiments 1-11 and 17-22.

Embodiment 29. A master node (900, 2312*a*, 2312*b*, 2312*c*, 2230, 2240, 2420) adapted to perform according to any of Embodiments 1-11 and 17-22.

Embodiment 30. A computer program comprising program code to be executed by processing circuitry (903, 2070, 2260, 2428) of a master node (900, 2312*a*, 2312*b*, 2312*c*, 2230, 2240, 2420), MN, whereby execution of the program code causes the MN (900, 2312*a*, 2312*b*, 2312*c*, 2230, 2240, 2420) to perform operations according to any of embodiments 1-11 and 17-22.

Embodiment 31. A computer program product comprising a non-transitory storage medium including program code to be executed by processing circuitry (903, 2070, 2260, 2428) of a master node (900, 2312*a*, 2312*b*, 2312*c*, 2230, 2240, 2420), whereby execution of the program code causes the master node (900, 2312*a*,

2312*b*, 2312*c*, 2230, 2240, 2420) to perform operations according to any of embodiments 1-11 and 17-22.

Embodiment 32. A secondary node (902, 2312*a*, 2312*b*, 2312*c*, 2230, 2240, 2420), SN, comprising:

processing circuitry (1003, 2070, 2260, 2428); and memory (1005, 2080, 2290) coupled with the processing circuitry, wherein the memory includes instructions that when executed by the processing circuitry causes the SN to perform operations according to any of Embodiments 12 and 23.

Embodiment 33. A secondary node (902, 2312*a*, 2312*b*, 2312*c*, 2230, 2240, 2420) adapted to perform according to any of Embodiments 12 and 23.

Embodiment 34. A computer program comprising program code to be executed by processing circuitry (1003, 2070, 2260, 2428) of a secondary node (902, 2312*a*, 2312*b*, 2312*c*, 2230, 2240, 2420), SN, whereby execution of the program code causes the SN (900, 2312*a*, 2312*b*, 2312*c*, 2230, 2240, 2420) to perform operations according to any of embodiments 12 and 23.

Embodiment 35. A computer program product comprising a non-transitory storage medium including program code to be executed by processing circuitry (1003, 2070, 2260, 2428) of a secondary node (902, 2312*a*, 2312*b*, 2312*c*, 2230, 2240, 2420), whereby execution of the program code causes the SN (902, 2312*a*, 2312*b*, 2312*c*, 2230, 2240, 2420) to perform operations according to any of embodiments 12 and 23.

Embodiment 36. A user equipment (904, 2100, 2230, 2240, 2391, 2392, 2430), UE, comprising:

processing circuitry (1103, 2020, 2101, 2260, 2428); and memory (1105, 2030, 2290) coupled with the processing circuitry, wherein the memory includes instructions that when executed by the processing circuitry causes the UE to perform operations according to any of Embodiments 13-16 and 24-27.

Embodiment 37. A user equipment (904, 2100, 2230, 2240, 2391, 2392, 2430), UE, adapted to perform according to any of Embodiments 13-16 and 24-27.

Embodiment 38. A computer program comprising program code to be executed by processing circuitry (903, 2070, 2260, 2428) of a user equipment (904, 2100, 2230, 2240, 2391, 2392, 2430), UE, whereby execution of the program code causes the UE (904, 2100, 2230, 2240, 2391, 2392, 2430) to perform operations according to any of embodiments 13-16 and 24-27.

Embodiment 39. A computer program product comprising a non-transitory storage medium including program code to be executed by processing circuitry (903, 2070, 2260, 2428) of a user equipment (904, 2100, 2230, 2240, 2391, 2392, 2430), UE, whereby execution of the program code causes the UE (904, 2100, 2230, 2240, 2391, 2392, 2430) to perform operations according to any of embodiments 13-16 and 24-27.

References are identified below.

R2-1914301, Report of 3GPP TSG RAN WG2 meeting #107bis, Chongqing, China, 14-18 Oct. 2019.

R2-1908679, Introducing suspension of SCG, 3GPP TSG RAN WG2 meeting #107, Prague, Czech, 26-30 Aug. 2019.

3GPP TS 36.331, V16.2.1 (2020-09), 3rd Generation Partnership Project; Technical Specification Group Radio Access Network; Evolved Universal Terrestrial Radio Access (E-UTRA); Radio Resource Control (RRC); Protocol specification (Release 16).

3GPP TS 38.331, V16.2.0 (2020-09), 3rd Generation Partnership Project; Technical Specification Group Radio Access Network; NR; Radio Resource Control (RRC); Protocol specification (Release 16).

3GPP TS 36.300, V16.2.3 (2020-09), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description, Stage 2 (Release 16).

3GPP TS 38.300, V16.3.0 (2020-09), 3rd Generation Partnership Project; Technical Specification Group Radio Access Network; NR; NR and NG-RAN Overall description; Stage 2 (Release 16).

3GPP TS 37.340, V16.3.0 (2020-09), 3rd Generation Partnership Project; Technical Specification Group Radio Access Network; Evolved Universal Terrestrial Radio Access (E-UTRA) and NR; Multi-connectivity; Stage 2 (Release 16).

3GPP TS 36.423, V16.3.0 (2020-09), 3rd Generation Partnership Project; Technical Specification Group Radio Access Network; Evolved Universal Terrestrial Radio Access Network (E-UTRAN); X2 application protocol (X2AP) (Release 16).

3GPP TS 38.423, V16.3.0 (2020-09), 3rd Generation Partnership Project; Technical Specification Group Radio Access Network; NG-RAN; X2 application protocol (X2AP) (Release 16).

3GPP TS 38.473, V16.3.1 (2020-10), 3rd Generation Partnership Project; Technical Specification Group Radio Access Network; NG-RAN; F1 application protocol (F1AP) (Release 16).

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 20 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network

2006, network nodes 2060 and 2060*b*, and WDs 2010, 2010*b*, and 2010*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 2060 and wireless device (WD) 2010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2060 and WD 2010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 2060 includes processing circuitry 2070, device readable medium 2080, interface 2090, auxiliary equipment 2084, power source 2086, power circuitry 2087, and antenna 2062. Although network node 2060 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 2060 are depicted as single boxes located within a larger box, or nested within multiple boxes, in practice, a network node may comprise multiple different physical components that make up a single illustrated component (e.g., device readable medium 2080 may comprise multiple separate hard drives as well as multiple RAM modules).

Similarly, network node 2060 may be composed of multiple physically separate components (e.g., a NodeB component and a RNC component, or a BTS component and a BSC component, etc.), which may each have their own respective components. In certain scenarios in which network node 2060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 2060 may be configured to support multiple radio access technologies (RATs). In such embodiments, some components may be duplicated (e.g., separate device readable medium 2080 for the different RATs) and some components may be reused (e.g., the same antenna 2062 may be shared by the RATs). Network node 2060 may also include multiple sets of the various illustrated components for different wireless technologies integrated into network node 2060, such as, for example, GSM, WCDMA, LTE, NR, WiFi, or Bluetooth wireless technologies. These wireless technologies may be integrated into the same or different chip or set of chips and other components within network node 2060.

Processing circuitry 2070 is configured to perform any determining, calculating, or similar operations (e.g., certain obtaining operations) described herein as being provided by a network node. These operations performed by processing circuitry 2070 may include processing information obtained by processing circuitry 2070 by, for example, converting the obtained information into other information, comparing the obtained information or converted information to information stored in the network node, and/or performing one or more operations based on the obtained information or converted information, and as a result of said processing making a determination.

Processing circuitry 2070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 2060 components, such as device readable medium 2080, network node 2060 functionality. For example, processing circuitry 2070 may execute instructions stored in device readable medium 2080 or in memory within processing circuitry 2070. Such functionality may include providing any of the various wireless features, functions, or benefits discussed herein. In some embodiments, processing circuitry 2070 may include a system on a chip (SOC).

In some embodiments, processing circuitry 2070 may include one or more of radio frequency (RF) transceiver circuitry 2072 and baseband processing circuitry 2074. In some embodiments, radio frequency (RF) transceiver circuitry 2072 and baseband processing circuitry 2074 may be on separate chips (or sets of chips), boards, or units, such as radio units and digital units. In alternative embodiments, part or all of RF transceiver circuitry 2072 and baseband processing circuitry 2074 may be on the same chip or set of chips, boards, or units In certain embodiments, some or all of the functionality described herein as being provided by a network node, base station, eNB or other such network device may be performed by processing circuitry 2070 executing instructions stored on device readable medium 2080 or memory within processing circuitry 2070. In alternative embodiments, some or all of the functionality may be provided by processing circuitry 2070 without executing instructions stored on a separate or discrete device readable medium, such as in a hard-wired manner. In any of those embodiments, whether executing instructions stored on a device readable storage medium or not, processing circuitry 2070 can be configured to perform the described functionality. The benefits provided by such functionality are not limited to processing circuitry 2070 alone or to other components of network node 2060, but are enjoyed by network node 2060 as a whole, and/or by end users and the wireless network generally.

Device readable medium 2080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2070. Device readable medium 2080 may store any suitable instructions, data or information, including a computer program, software, an application including one or more of logic, rules, code, tables, etc. and/or other instructions capable of being executed by processing circuitry 2070 and, utilized by network node 2060. Device readable medium 2080 may be used to store any calculations made by processing circuitry 2070 and/or any data received via interface 2090. In some embodiments, processing circuitry 2070 and device readable medium 2080 may be considered to be integrated.

Interface 2090 is used in the wired or wireless communication of signalling and/or data between network node 2060, network 2006, and/or WDs 2010. As illustrated, interface 2090 comprises port(s)/terminal(s) 2094 to send and receive data, for example to and from network 2006 over a wired connection. Interface 2090 also includes radio front end circuitry 2092 that may be coupled to, or in certain embodiments a part of, antenna 2062. Radio front end circuitry 2092 comprises filters 2098 and amplifiers 2096. Radio front end circuitry 2092 may be connected to antenna 2062 and processing circuitry 2070. Radio front end circuitry may be configured to condition signals communicated between antenna 2062 and processing circuitry 2070. Radio front end circuitry 2092 may receive digital data that is to be sent out to other network nodes or WDs via a wireless connection. Radio front end circuitry 2092 may convert the digital data into a radio signal having the appropriate channel and bandwidth parameters using a combination of filters 2098 and/or amplifiers 2096. The radio signal may then be transmitted via antenna 2062. Similarly, when receiving data, antenna 2062 may collect radio signals which are then converted into digital data by radio front end circuitry 2092. The digital data may be passed to processing circuitry 2070. In other embodiments, the interface may comprise different components and/or different combinations of components.

In certain alternative embodiments, network node 2060 may not include separate radio front end circuitry 2092, instead, processing circuitry 2070 may comprise radio front end circuitry and may be connected to antenna 2062 without separate radio front end circuitry 2092. Similarly, in some embodiments, all or some of RF transceiver circuitry 2072 may be considered a part of interface 2090. In still other embodiments, interface 2090 may include one or more ports or terminals 2094, radio front end circuitry 2092, and RF transceiver circuitry 2072, as part of a radio unit (not shown), and interface 2090 may communicate with baseband processing circuitry 2074, which is part of a digital unit (not shown).

Antenna 2062 may include one or more antennas, or antenna arrays, configured to send and/or receive wireless signals. Antenna 2062 may be coupled to radio front end circuitry 2092 and may be any type of antenna capable of transmitting and receiving data and/or signals wirelessly. In some embodiments, antenna 2062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2062 may be separate from network node 2060 and may be connectable to network node 2060 through an interface or port.

Antenna 2062, interface 2090, and/or processing circuitry 2070 may be configured to perform any receiving operations and/or certain obtaining operations described herein as being performed by a network node. Any information, data and/or signals may be received from a wireless device, another network node and/or any other network equipment. Similarly, antenna 2062, interface 2090, and/or processing circuitry 2070 may be configured to perform any transmitting operations described herein as being performed by a network node. Any information, data and/or signals may be transmitted to a wireless device, another network node and/or any other network equipment.

Power circuitry 2087 may comprise, or be coupled to, power management circuitry and is configured to supply the components of network node 2060 with power for performing the functionality described herein. Power circuitry 2087 may receive power from power source 2086. Power source 2086 and/or power circuitry 2087 may be configured to provide power to the various components of network node 2060 in a form suitable for the respective components (e.g., at a voltage and current level needed for each respective component). Power source 2086 may either be included in, or external to, power circuitry 2087 and/or network node 2060. For example, network node 2060 may be connectable to an external power source (e.g., an electricity outlet) via an input circuitry or interface such as an electrical cable, whereby the external power source supplies power to power circuitry 2087. As a further example, power source 2086 may comprise a source of power in the form of a battery or battery pack which is connected to, or integrated in, power circuitry 2087. The battery may provide backup power should the external power source fail. Other types of power sources, such as photovoltaic devices, may also be used.

Alternative embodiments of network node 2060 may include additional components beyond those shown in FIG. 20 that may be responsible for providing certain aspects of the network node's functionality, including any of the functionality described herein and/or any functionality necessary to support the subject matter described herein. For example, network node 2060 may include user interface equipment to allow input of information into network node 2060 and to allow output of information from network node 2060. This may allow a user to perform diagnostic, maintenance, repair, and other administrative functions for network node 2060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 2010 includes antenna 2011, interface 2014, processing circuitry 2020, device readable medium 2030, user interface equipment 2032, auxiliary equipment 2034, power source 2036 and power circuitry 2037. WD 2010 may include multiple sets of one or more of the illustrated components for different wireless technologies supported by WD 2010, such as, for example, GSM, WCDMA, LTE, NR, WiFi, WiMAX, or Bluetooth wireless technologies, just to mention a few. These wireless technologies may be integrated into the same or different chips or set of chips as other components within WD 2010.

Antenna 2011 may include one or more antennas or antenna arrays, configured to send and/or receive wireless signals, and is connected to interface 2014. In certain alternative embodiments, antenna 2011 may be separate from WD 2010 and be connectable to WD 2010 through an interface or port. Antenna 2011, interface 2014, and/or processing circuitry 2020 may be configured to perform any receiving or transmitting operations described herein as being performed by a WD. Any information, data and/or signals may be received from a network node and/or another WD. In some embodiments, radio front end circuitry and/or antenna 2011 may be considered an interface.

As illustrated, interface 2014 comprises radio front end circuitry 2012 and antenna 2011. Radio front end circuitry 2012 comprise one or more filters 2018 and amplifiers 2016. Radio front end circuitry 2012 is connected to antenna 2011 and processing circuitry 2020, and is configured to condition signals communicated between antenna 2011 and processing circuitry 2020. Radio front end circuitry 2012 may be coupled to or a part of antenna 2011. In some embodiments, WD 2010 may not include separate radio front end circuitry 2012; rather, processing circuitry 2020 may comprise radio front end circuitry and may be connected to antenna 2011. Similarly, in some embodiments, some or all of RF transceiver circuitry 2022 may be considered a part of interface 2014. Radio front end circuitry 2012 may receive digital data that is to be sent out to other network nodes or WDs via a wireless connection. Radio front end circuitry 2012 may convert the digital data into a radio signal having the appropriate channel and bandwidth parameters using a combination of filters 2018 and/or amplifiers 2016. The radio signal may then be transmitted via antenna 2011. Similarly, when receiving data, antenna 2011 may collect radio signals which are then converted into digital data by radio front end circuitry 2012. The digital data may be passed to processing circuitry 2020. In other embodiments, the interface may comprise different components and/or different combinations of components.

Processing circuitry 2020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 2010 components, such as device readable medium 2030, WD 2010 functionality. Such functionality may include providing any of the various wireless features or benefits discussed herein. For example, processing circuitry 2020 may execute instructions stored in device readable medium 2030 or in memory within processing circuitry 2020 to provide the functionality disclosed herein.

As illustrated, processing circuitry 2020 includes one or more of RF transceiver circuitry 2022, baseband processing circuitry 2024, and application processing circuitry 2026. In other embodiments, the processing circuitry may comprise different components and/or different combinations of components. In certain embodiments processing circuitry 2020 of WD 2010 may comprise a SOC. In some embodiments, RF transceiver circuitry 2022, baseband processing circuitry 2024, and application processing circuitry 2026 may be on separate chips or sets of chips. In alternative embodiments, part or all of baseband processing circuitry 2024 and application processing circuitry 2026 may be combined into one chip or set of chips, and RF transceiver circuitry 2022 may be on a separate chip or set of chips. In still alternative embodiments, part or all of RF transceiver circuitry 2022 and baseband processing circuitry 2024 may be on the same chip or set of chips, and application processing circuitry 2026 may be on a separate chip or set of chips. In yet other alternative embodiments, part or all of RF transceiver circuitry 2022, baseband processing circuitry 2024, and application processing circuitry 2026 may be combined in the same chip or set of chips. In some embodiments, RF transceiver circuitry 2022 may be a part of interface 2014. RF transceiver circuitry 2022 may condition RF signals for processing circuitry 2020.

In certain embodiments, some or all of the functionality described herein as being performed by a WD may be provided by processing circuitry 2020 executing instructions stored on device readable medium 2030, which in certain embodiments may be a computer-readable storage medium. In alternative embodiments, some or all of the functionality may be provided by processing circuitry 2020 without executing instructions stored on a separate or discrete device readable storage medium, such as in a hard-wired manner. In any of those particular embodiments, whether executing instructions stored on a device readable storage medium or not, processing circuitry 2020 can be configured to perform the described functionality. The benefits provided by such functionality are not limited to processing circuitry 2020 alone or to other components of WD 2010, but are enjoyed by WD 2010 as a whole, and/or by end users and the wireless network generally.

Processing circuitry 2020 may be configured to perform any determining, calculating, or similar operations (e.g., certain obtaining operations) described herein as being performed by a WD. These operations, as performed by processing circuitry 2020, may include processing information obtained by processing circuitry 2020 by, for example, converting the obtained information into other information, comparing the obtained information or converted information to information stored by WD 2010, and/or performing one or more operations based on the obtained information or converted information, and as a result of said processing making a determination.

Device readable medium 2030 may be operable to store a computer program, software, an application including one or more of logic, rules, code, tables, etc. and/or other instructions capable of being executed by processing circuitry 2020. Device readable medium 2030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 2020. In some embodiments, processing circuitry 2020 and device readable medium 2030 may be considered to be integrated.

User interface equipment 2032 may provide components that allow for a human user to interact with WD 2010. Such interaction may be of many forms, such as visual, audial, tactile, etc. User interface equipment 2032 may be operable to produce output to the user and to allow the user to provide input to WD 2010. The type of interaction may vary depending on the type of user interface equipment 2032 installed in WD 2010. For example, if WD 2010 is a smart phone, the interaction may be via a touch screen; if WD 2010 is a smart meter, the interaction may be through a screen that provides usage (e.g., the number of gallons used) or a speaker that provides an audible alert (e.g., if smoke is detected). User interface equipment 2032 may include input interfaces, devices and circuits, and output interfaces, devices and circuits. User interface equipment 2032 is configured to allow input of information into WD 2010, and is connected to processing circuitry 2020 to allow processing circuitry 2020 to process the input information. User interface equipment 2032 may include, for example, a microphone, a proximity or other sensor, keys/buttons, a touch display, one or more cameras, a USB port, or other input circuitry. User interface equipment 2032 is also configured to allow output of information from WD 2010, and to allow processing circuitry 2020 to output information from WD 2010. User interface equipment 2032 may include, for example, a speaker, a display, vibrating circuitry, a USB port, a headphone interface, or other output circuitry. Using one or more input and output interfaces, devices, and circuits, of user interface equipment 2032, WD 2010 may communicate with end users and/or the wireless network, and allow them to benefit from the functionality described herein.

Auxiliary equipment 2034 is operable to provide more specific functionality which may not be generally performed by WDs. This may comprise specialized sensors for doing measurements for various purposes, interfaces for additional types of communication such as wired communications etc. The inclusion and type of components of auxiliary equipment 2034 may vary depending on the embodiment and/or scenario.

Power source 2036 may, in some embodiments, be in the form of a battery or battery pack. Other types of power sources, such as an external power source (e.g., an electricity outlet), photovoltaic devices or power cells, may also be used. WD 2010 may further comprise power circuitry 2037 for delivering power from power source 2036 to the various parts of WD 2010 which need power from power source 2036 to carry out any functionality described or indicated herein. Power circuitry 2037 may in certain embodiments comprise power management circuitry. Power circuitry 2037 may additionally or alternatively be operable to receive power from an external power source; in which case WD 2010 may be connectable to the external power source (such as an electricity outlet) via input circuitry or an interface such as an electrical power cable. Power circuitry 2037 may also in certain embodiments be operable to deliver power from an external power source to power source 2036. This may be, for example, for the charging of power source 2036. Power circuitry 2037 may perform any formatting, converting, or other modification to the power from power source 2036 to make the power suitable for the respective components of WD 2010 to which power is supplied.

Figure 21:
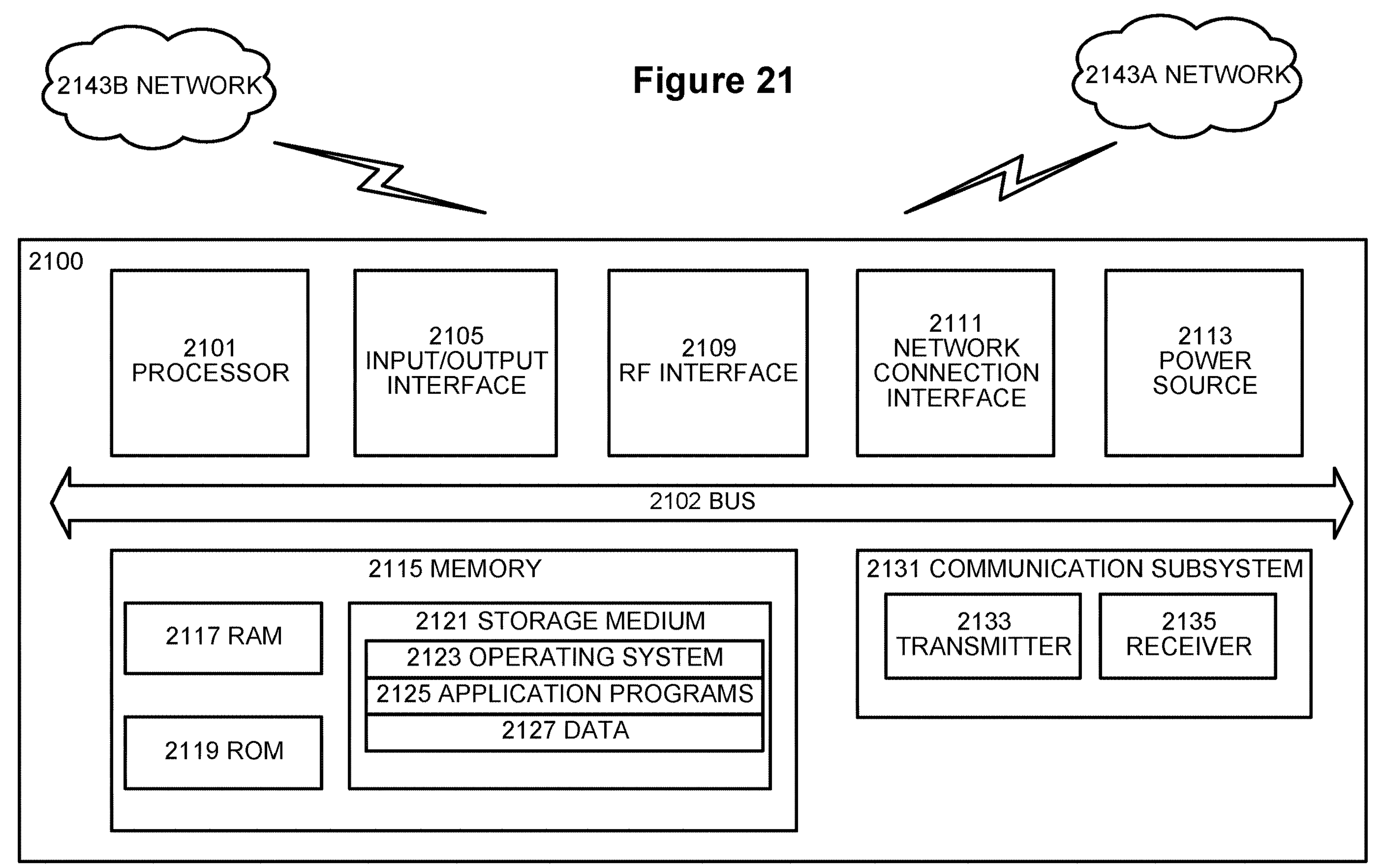
FIG. 21 is a block diagram of a user equipment in accordance with some embodiments

FIG. 21 illustrates a user Equipment in accordance with some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 21200 may be any UE identified by the 3rd Generation Partnership Project (3GPP), including a NB-IoT UE, a machine type communication (MTC) UE, and/or an enhanced MTC (eMTC) UE. UE 2100, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 2100 includes processing circuitry 2101 that is operatively coupled to input/output interface 2105, radio frequency (RF) interface 2109, network connection interface 2111, memory 2115 including random access memory (RAM) 2117, read-only memory (ROM) 2119, and storage medium 2121 or the like, communication subsystem 2131, power source 2113, and/or any other component, or any combination thereof. Storage medium 2121 includes operating system 2123, application program 2125, and data 2127. In other embodiments, storage medium 2121 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 2101 may be configured to process computer instructions and data. Processing circuitry 2101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2101 may include two central processing units (CPUs). Data may be information in a form suitable for use by a computer.

In the depicted embodiment, input/output interface 2105 may be configured to provide a communication interface to an input device, output device, or input and output device. UE 2100 may be configured to use an output device via input/output interface 2105. An output device may use the same type of interface port as an input device. For example, a USB port may be used to provide input to and output from UE 2100. The output device may be a speaker, a sound card, a video card, a display, a monitor, a printer, an actuator, an emitter, a smartcard, another output device, or any combination thereof. UE 2100 may be configured to use an input device via input/output interface 2105 to allow a user to capture information into UE 2100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 2109 may be configured to provide a communication interface to RF components such as a transmitter, a receiver, and an antenna. Network connection interface 2111 may be configured to provide a communication interface to network **2143*a*. Network 2143*a* may encompass wired and/or wireless networks such as a local-area network (LAN), a wide-area network (WAN), a computer network, a wireless network, a telecommunications network, another like network or any combination thereof. For example, network 2143*a* may comprise a Wi-Fi network. Network connection interface 2111 may be configured to include a receiver and a transmitter interface used to communicate with one or more other devices over a communication network according to one or more communication protocols, such as Ethernet, TCP/IP, SONET, ATM, or the like. Network connection interface 2111** may implement receiver and transmitter functionality appropriate to the communication network links (e.g., optical, electrical, and the like). The transmitter and receiver functions may share circuit components, software or firmware, or alternatively may be implemented separately.

RAM 2117 may be configured to interface via bus 2102 to processing circuitry 2101 to provide storage or caching of data or computer instructions during the execution of software programs such as the operating system, application programs, and device drivers. ROM 2119 may be configured to provide computer instructions or data to processing circuitry 2101. For example, ROM 2119 may be configured to store invariant low-level system code or data for basic system functions such as basic input and output (I/O), startup, or reception of keystrokes from a keyboard that are stored in a non-volatile memory. Storage medium 2121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 2121 may be configured to include operating system 2123, application program 2125 such as a web browser application, a widget or gadget engine or another application, and data file 2127. Storage medium 2121 may store, for use by UE 2100, any of a variety of various operating systems or combinations of operating systems.

Storage medium 2121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HODS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2121 may allow UE 2100 to access computer-executable instructions, application programs or the like, stored on transitory or non-transitory memory media, to off-load data, or to upload data. An article of manufacture, such as one utilizing a communication system may be tangibly embodied in storage medium 2121, which may comprise a device readable medium.

In FIG. 21, processing circuitry 2101 may be configured to communicate with network 2143*b* using communication subsystem 2131. Network 2143*a* and network 2143*b* may be the same network or networks or different network or networks. Communication subsystem 2131 may be configured to include one or more transceivers used to communicate with network 2143*b*. For example, communication subsystem 2131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 2133 and/or receiver 2135 to implement transmitter or receiver functionality, respectively, appropriate to the RAN links (e.g., frequency allocations and the like). Further, transmitter 2133 and receiver 2135 of each transceiver may share circuit components, software or firmware, or alternatively may be implemented separately.

In the illustrated embodiment, the communication functions of communication subsystem 2131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 2131 may include cellular communication, Wi-Fi communication, Bluetooth communication, and GPS communication. Network 2143*b* may encompass wired and/or wireless networks such as a local-area network (LAN), a wide-area network (WAN), a computer network, a wireless network, a telecommunications network, another like network or any combination thereof. For example, network 2143*b* may be a cellular network, a Wi-Fi network, and/or a near-field network. Power source 2113 may be configured to provide alternating current (AC) or direct current (DC) power to components of UE 2100.

The features, benefits and/or functions described herein may be implemented in one of the components of UE 2100 or partitioned across multiple components of UE 2100. Further, the features, benefits, and/or functions described herein may be implemented in any combination of hardware, software or firmware. In one example, communication subsystem 2131 may be configured to include any of the components described herein. Further, processing circuitry 2101 may be configured to communicate with any of such components over bus 2102. In another example, any of such components may be represented by program instructions stored in memory that when executed by processing circuitry 2101 perform the corresponding functions described herein. In another example, the functionality of any of such components may be partitioned between processing circuitry 2101 and communication subsystem 2131. In another example, the non-computationally intensive functions of any of such components may be implemented in software or firmware and the computationally intensive functions may be implemented in hardware.

FIG. 22 illustrates a virtualization environment in accordance with some embodiments.

FIG. 22 is a schematic block diagram illustrating a virtualization environment 2200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 2200 hosted by one or more of hardware nodes 2230. Further, in embodiments in which the virtual node is not a radio access node or does not require radio connectivity (e.g., a core network node), then the network node may be entirely virtualized.

The functions may be implemented by one or more applications 2220 (which may alternatively be called software instances, virtual appliances, network functions, virtual nodes, virtual network functions, etc.) operative to implement some of the features, functions, and/or benefits of some of the embodiments disclosed herein. Applications 2220 are run in virtualization environment 2200 which provides hardware 2230 comprising processing circuitry 2260 and memory 2290. Memory 2290 contains instructions 2295 executable by processing circuitry 2260 whereby application 2220 is operative to provide one or more of the features, benefits, and/or functions disclosed herein.

Virtualization environment 2200, comprises general-purpose or special-purpose network hardware devices 2230 comprising a set of one or more processors or processing circuitry 2260, which may be commercial off-the-shelf (COTS) processors, dedicated Application Specific Integrated Circuits (ASICs), or any other type of processing circuitry including digital or analog hardware components or special purpose processors. Each hardware device may comprise memory 2290-1 which may be non-persistent memory for temporarily storing instructions 2295 or software executed by processing circuitry 2260. Each hardware device may comprise one or more network interface controllers (NICs) 2270, also known as network interface cards, which include physical network interface 2280. Each hardware device may also include non-transitory, persistent, machine-readable storage media 2290-2 having stored therein software 2295 and/or instructions executable by processing circuitry 2260. Software 2295 may include any type of software including software for instantiating one or more virtualization layers 2250 (also referred to as hypervisors), software to execute virtual machines 2240 as well as software allowing it to execute functions, features and/or benefits described in relation with some embodiments described herein.

Virtual machines 2240 comprise virtual processing, virtual memory, virtual networking or interface and virtual storage, and may be run by a corresponding virtualization layer 2250 or hypervisor. Different embodiments of the instance of virtual appliance 2220 may be implemented on one or more of virtual machines 2240, and the implementations may be made in different ways.

During operation, processing circuitry 2260 executes software 2295 to instantiate the hypervisor or virtualization layer 2250, which may sometimes be referred to as a virtual machine monitor (VMM). Virtualization layer 2250 may present a virtual operating platform that appears like networking hardware to virtual machine 2240.

As shown in FIG. 22, hardware 2230 may be a standalone network node with generic or specific components. Hardware 2230 may comprise antenna 22225 and may implement some functions via virtualization. Alternatively, hardware 2230 may be part of a larger cluster of hardware (e.g. such as in a data center or customer premise equipment (CPE)) where many hardware nodes work together and are managed via management and orchestration (MANO) 22100, which, among others, oversees lifecycle management of applications 2220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 2240 may be a software implementation of a physical machine that runs programs as if they were executing on a physical, non-virtualized machine. Each of virtual machines 2240, and that part of hardware 2230 that executes that virtual machine, be it hardware dedicated to that virtual machine and/or hardware shared by that virtual machine with others of the virtual machines 2240, forms a separate virtual network elements (VNE).

Still in the context of NFV, Virtual Network Function (VNF) is responsible for handling specific network functions that run in one or more virtual machines 2240 on top of hardware networking infrastructure 2230 and corresponds to application 2220 in FIG. 22.

In some embodiments, one or more radio units 22200 that each include one or more transmitters 22220 and one or more receivers 22210 may be coupled to one or more antennas 22225. Radio units 22200 may communicate directly with hardware nodes 2230 via one or more appropriate network interfaces and may be used in combination with the virtual components to provide a virtual node with radio capabilities, such as a radio access node or a base station.

In some embodiments, some signalling can be effected with the use of control system 22230 which may alternatively be used for communication between the hardware nodes 2230 and radio units 22200.

Figure 23:
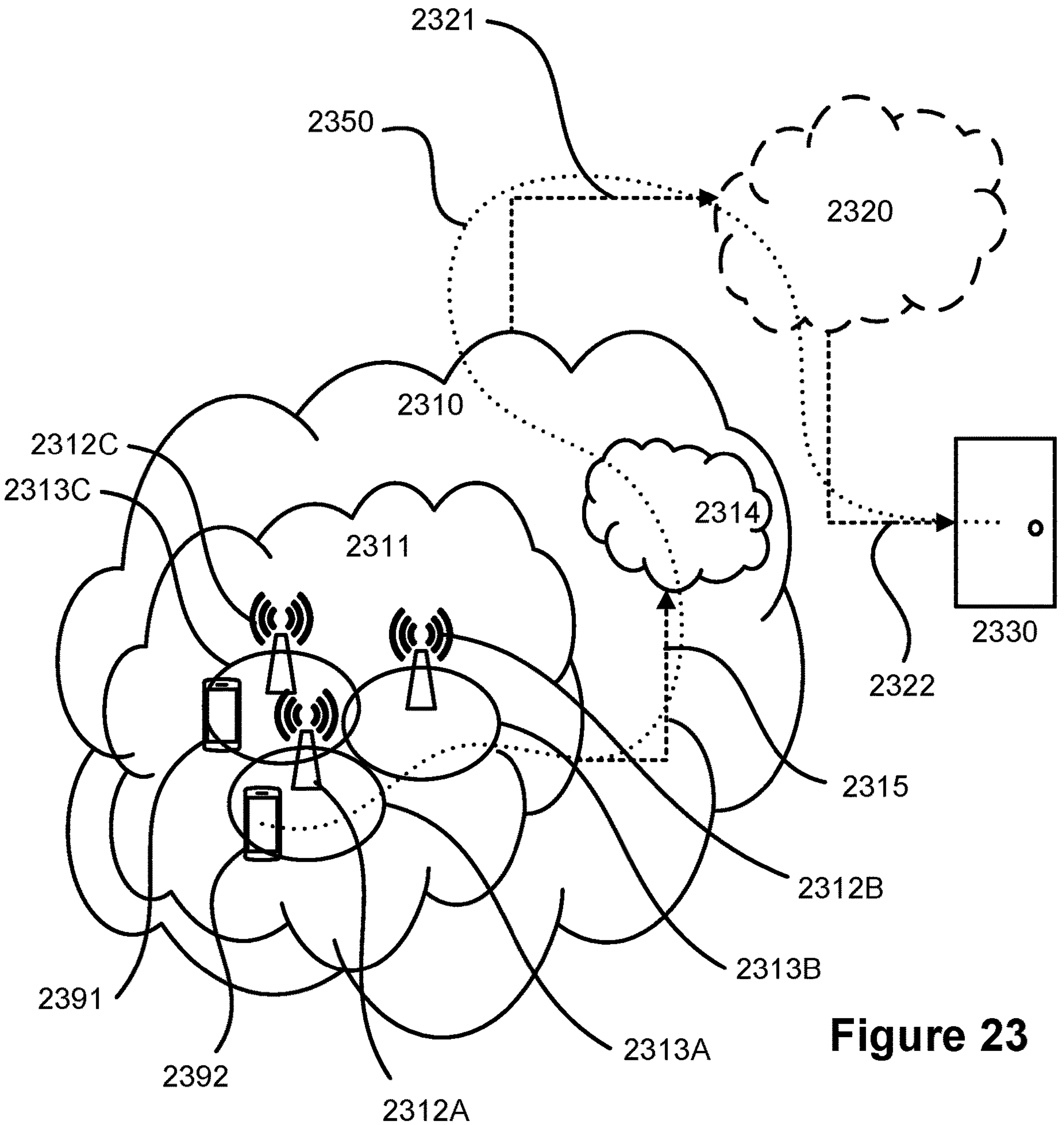
FIG. 23 is a block diagram of a telecommunication network connected via an intermediate network to a host computer in accordance with some embodiments.

FIG. 23 illustrates a telecommunication network connected via an intermediate network to a host computer in accordance with some embodiments.

With reference to FIG. 23, in accordance with an embodiment, a communication system includes telecommunication network 2310, such as a 3GPP-type cellular network, which comprises access network 2311, such as a radio access network, and core network 2314. Access network 2311 comprises a plurality of base stations **2312*a*, 2312*b*, 2312*c*, such as NBs, eNBs, gNBs or other types of wireless access points, each defining a corresponding coverage area 2313*a*, 2313*b*, 2313*c*. Each base station 2312*a*, 2312*b*, 2312*c* is connectable to core network 2314 over a wired or wireless connection 2315. A first UE 2391 located in coverage area 2313*c* is configured to wirelessly connect to, or be paged by, the corresponding base station 2312*c*. A second UE 2392 in coverage area 2313*a* is wirelessly connectable to the corresponding base station 2312*a*. While a plurality of UEs 2391, 2392 are illustrated in this example, the disclosed embodiments are equally applicable to a situation where a sole UE is in the coverage area or where a sole UE is connecting to the corresponding base station 2312**.

Telecommunication network 2310 is itself connected to host computer 2330, which may be embodied in the hardware and/or software of a standalone server, a cloud-implemented server, a distributed server or as processing resources in a server farm. Host computer 2330 may be under the ownership or control of a service provider, or may be operated by the service provider or on behalf of the service provider. Connections 2321 and 2322 between telecommunication network 2310 and host computer 2330 may extend directly from core network 2314 to host computer 2330 or may go via an optional intermediate network 2320. Intermediate network 2320 may be one of, or a combination of more than one of, a public, private or hosted network; intermediate network 2320, if any, may be a backbone network or the Internet; in particular, intermediate network 2320 may comprise two or more sub-networks (not shown).

The communication system of FIG. 23 as a whole enables connectivity between the connected UEs 2391, 2392 and host computer 2330. The connectivity may be described as an over-the-top (OTT) connection 2350. Host computer 2330 and the connected UEs 2391, 2392 are configured to communicate data and/or signaling via OTT connection 2350, using access network 2311, core network 2314, any intermediate network 2320 and possible further infrastructure (not shown) as intermediaries. OTT connection 2350 may be transparent in the sense that the participating communication devices through which OTT connection 2350 passes are unaware of routing of uplink and downlink communications. For example, base station 2312 may not or need not be informed about the past routing of an incoming downlink communication with data originating from host computer 2330 to be forwarded (e.g., handed over) to a connected UE 2391. Similarly, base station 2312 need not be aware of the future routing of an outgoing uplink communication originating from the UE 2391 towards the host computer 2330.

Figure 24:
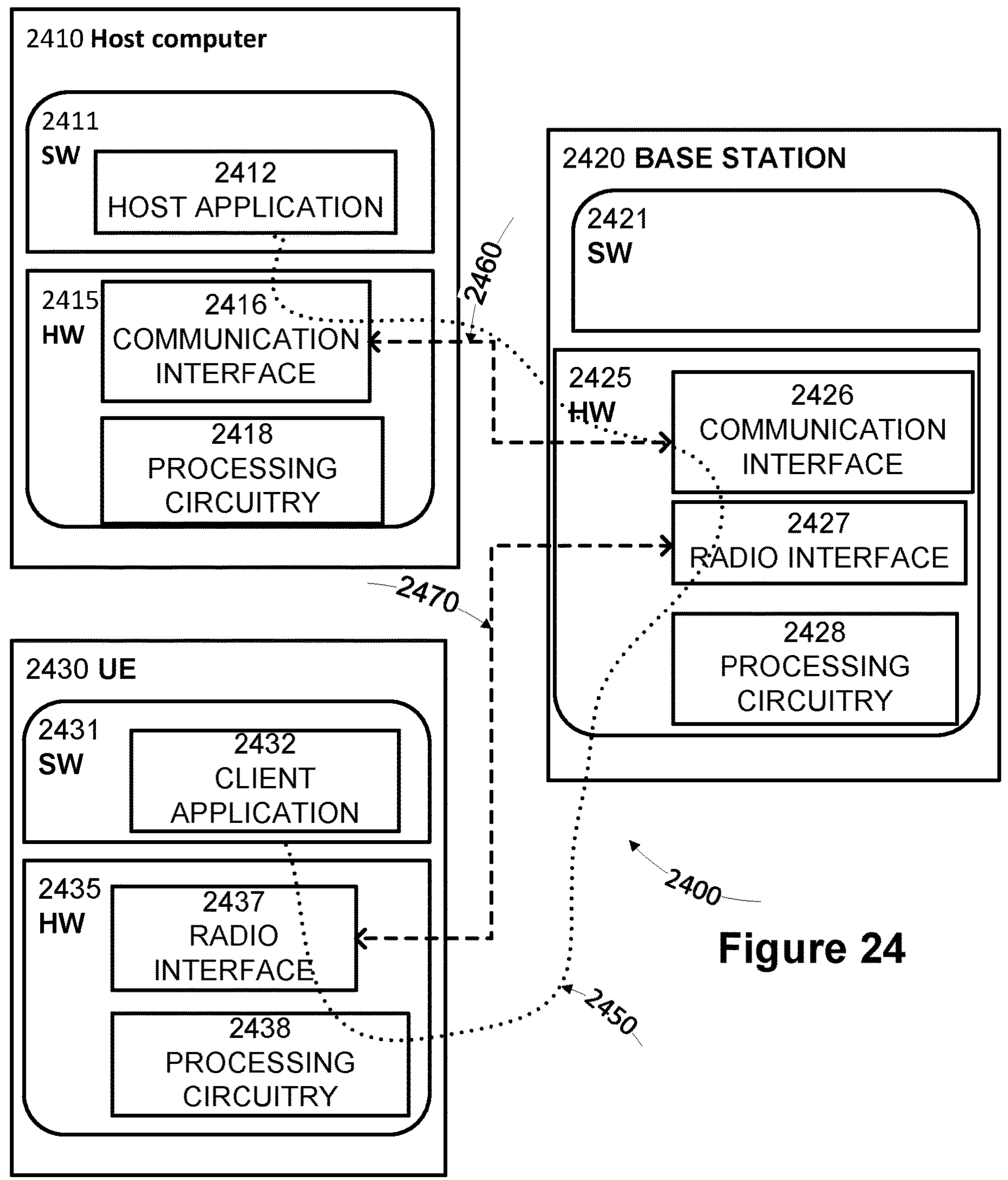
FIG. 24 is a block diagram of a host computer communicating via a base station with a user equipment over a partially wireless connection in accordance with some embodiments.

FIG. 24 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 24. In communication system 2400, host computer 2410 comprises hardware 2415 including communication interface 2416 configured to set up and maintain a wired or wireless connection with an interface of a different communication device of communication system 2400. Host computer 2410 further comprises processing circuitry 2418, which may have storage and/or processing capabilities. In particular, processing circuitry 2418 may comprise one or more programmable processors, application-specific integrated circuits, field programmable gate arrays or combinations of these (not shown) adapted to execute instructions. Host computer 2410 further comprises software 2411, which is stored in or accessible by host computer 2410 and executable by processing circuitry 2418. Software 2411 includes host application 2412. Host application 2412 may be operable to provide a service to a remote user, such as UE 2430 connecting via OTT connection 2450 terminating at UE 2430 and host computer 2410. In providing the service to the remote user, host application 2412 may provide user data which is transmitted using OTT connection 2450.

Communication system 2400 further includes base station 2420 provided in a telecommunication system and comprising hardware 2425 enabling it to communicate with host computer 2410 and with UE 2430. Hardware 2425 may include communication interface 2426 for setting up and maintaining a wired or wireless connection with an interface of a different communication device of communication system 2400, as well as radio interface 2427 for setting up and maintaining at least wireless connection 2470 with UE 2430 located in a coverage area (not shown in FIG. 24) served by base station 2420. Communication interface 2426 may be configured to facilitate connection 2460 to host computer 2410. Connection 2460 may be direct or it may pass through a core network (not shown in FIG. 24) of the telecommunication system and/or through one or more intermediate networks outside the telecommunication system. In the embodiment shown, hardware 2425 of base station 2420 further includes processing circuitry 2428, which may comprise one or more programmable processors, application-specific integrated circuits, field programmable gate arrays or combinations of these (not shown) adapted to execute instructions. Base station 2420 further has software 2421 stored internally or accessible via an external connection.

Communication system 2400 further includes UE 2430 already referred to. Its hardware 2435 may include radio interface 2437 configured to set up and maintain wireless connection 2470 with a base station serving a coverage area in which UE 2430 is currently located. Hardware 2435 of UE 2430 further includes processing circuitry 2438, which may comprise one or more programmable processors, application-specific integrated circuits, field programmable gate arrays or combinations of these (not shown) adapted to execute instructions. UE 2430 further comprises software 2431, which is stored in or accessible by UE 2430 and executable by processing circuitry 2438. Software 2431 includes client application 2432. Client application 2432 may be operable to provide a service to a human or non-human user via UE 2430, with the support of host computer 2410. In host computer 2410, an executing host application 2412 may communicate with the executing client application 2432 via OTT connection 2450 terminating at UE 2430 and host computer 2410. In providing the service to the user, client application 2432 may receive request data from host application 2412 and provide user data in response to the request data. OTT connection 2450 may transfer both the request data and the user data. Client application 2432 may interact with the user to generate the user data that it provides.

It is noted that host computer 2410, base station 2420 and UE 2430 illustrated in FIG. 24 may be similar or identical to host computer 2330, one of base stations 2312*a*, 2312*b*, 2312*c* and one of UEs 2391, 2392 of FIG. 23, respectively. This is to say, the inner workings of these entities may be as shown in FIG. 24 and independently, the surrounding network topology may be that of FIG. 23.

In FIG. 24, OTT connection 2450 has been drawn abstractly to illustrate the communication between host computer 2410 and UE 2430 via base station 2420, without explicit reference to any intermediary devices and the precise routing of messages via these devices. Network infrastructure may determine the routing, which it may be configured to hide from UE 2430 or from the service provider operating host computer 2410, or both. While OTT connection 2450 is active, the network infrastructure may further take decisions by which it dynamically changes the routing (e.g., on the basis of load balancing consideration or reconfiguration of the network).

Wireless connection 2470 between UE 2430 and base station 2420 is in accordance with the teachings of the embodiments described throughout this disclosure. One or more of the various embodiments may improve the performance of OTT services provided to UE 2430 using OTT connection 2450, in which wireless connection 2470 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 2450 between host computer 2410 and UE 2430, in response to variations in the measurement results. The measurement procedure and/or the network functionality for reconfiguring OTT connection 2450 may be implemented in software 2411 and hardware 2415 of host computer 2410 or in software 2431 and hardware 2435 of UE 2430, or both. In embodiments, sensors (not shown) may be deployed in or in association with communication devices through which OTT connection 2450 passes; the sensors may participate in the measurement procedure by supplying values of the monitored quantities exemplified above, or supplying values of other physical quantities from which software 2411, 2431 may compute or estimate the monitored quantities. The reconfiguring of OTT connection 2450 may include message format, retransmission settings, preferred routing etc.; the reconfiguring need not affect base station 2420, and it may be unknown or imperceptible to base station 2420. Such procedures and functionalities may be known and practiced in the art. In certain embodiments, measurements may involve proprietary UE signaling facilitating host computer 2410's measurements of throughput, propagation times, latency and the like. The measurements may be implemented in that software 2411 and 2431 causes messages to be transmitted, in particular empty or 'dummy' messages, using OTT connection 2450 while it monitors propagation times, errors etc.

Figures 25, 26:
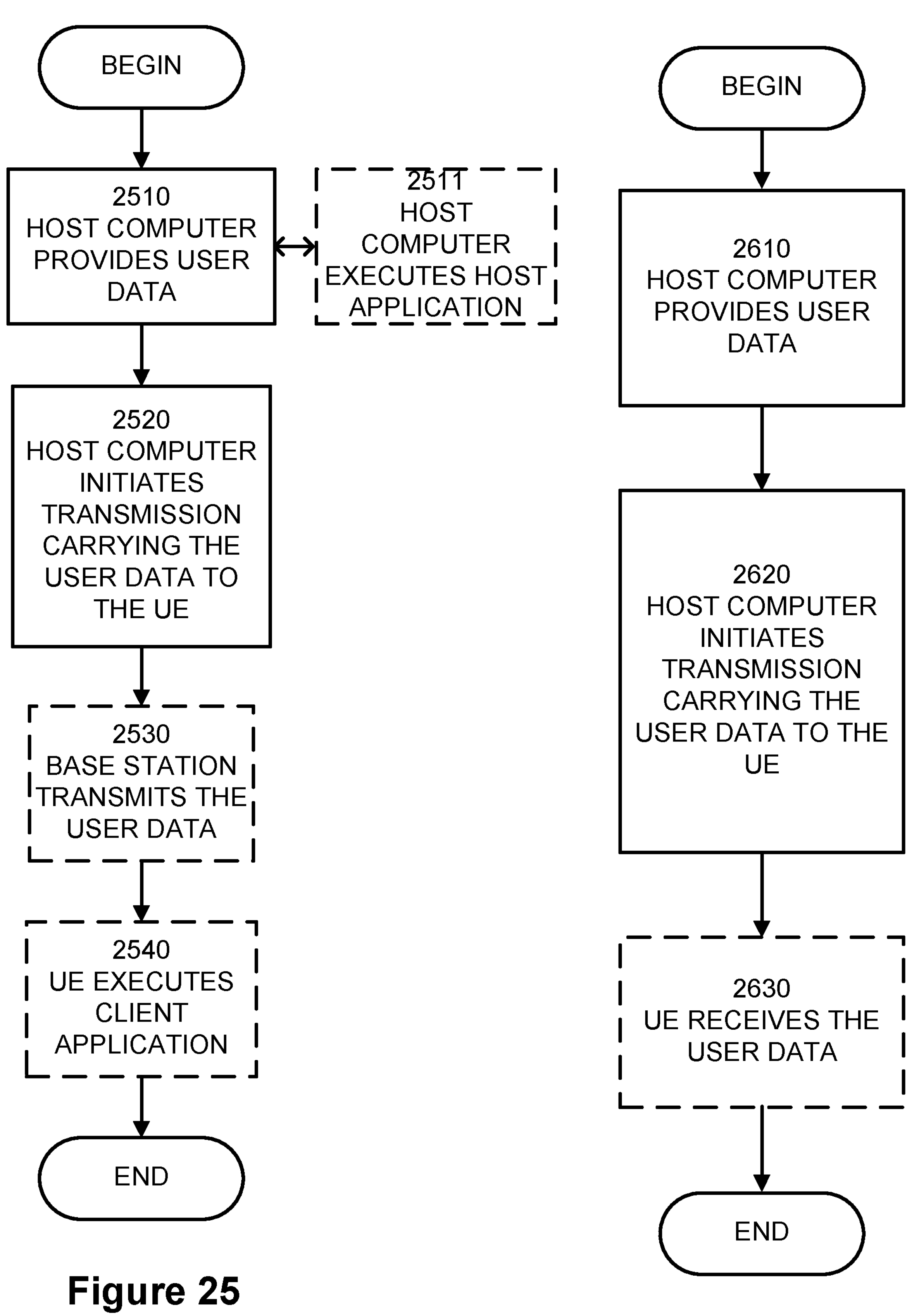
FIG. 25 is a block diagram of methods implemented in a communication system including a host computer, a base station and a user equipment in accordance with some embodiments.
FIG. 26 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to Figure will be included in this section. In step 2510, the host computer provides user data. In substep 2511 (which may be optional) of step 2510, the host computer provides the user data by executing a host application. In step 2520, the host computer initiates a transmission carrying the user data to the UE. In step 2530 (which may be optional), the base station transmits to the UE the user data which was carried in the transmission that the host computer initiated, in accordance with the teachings of the embodiments described throughout this disclosure. In step 2540 (which may also be optional), the UE executes a client application associated with the host application executed by the host computer.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 2610 of the method, the host computer provides user data. In an optional substep (not shown) the host computer provides the user data by executing a host application. In step 2620, the host computer initiates a transmission carrying the user data to the UE. The transmission may pass via the base station, in accordance with the teachings of the embodiments described throughout this disclosure. In step 2630 (which may be optional), the UE receives the user data carried in the transmission.

Figures 27, 28:
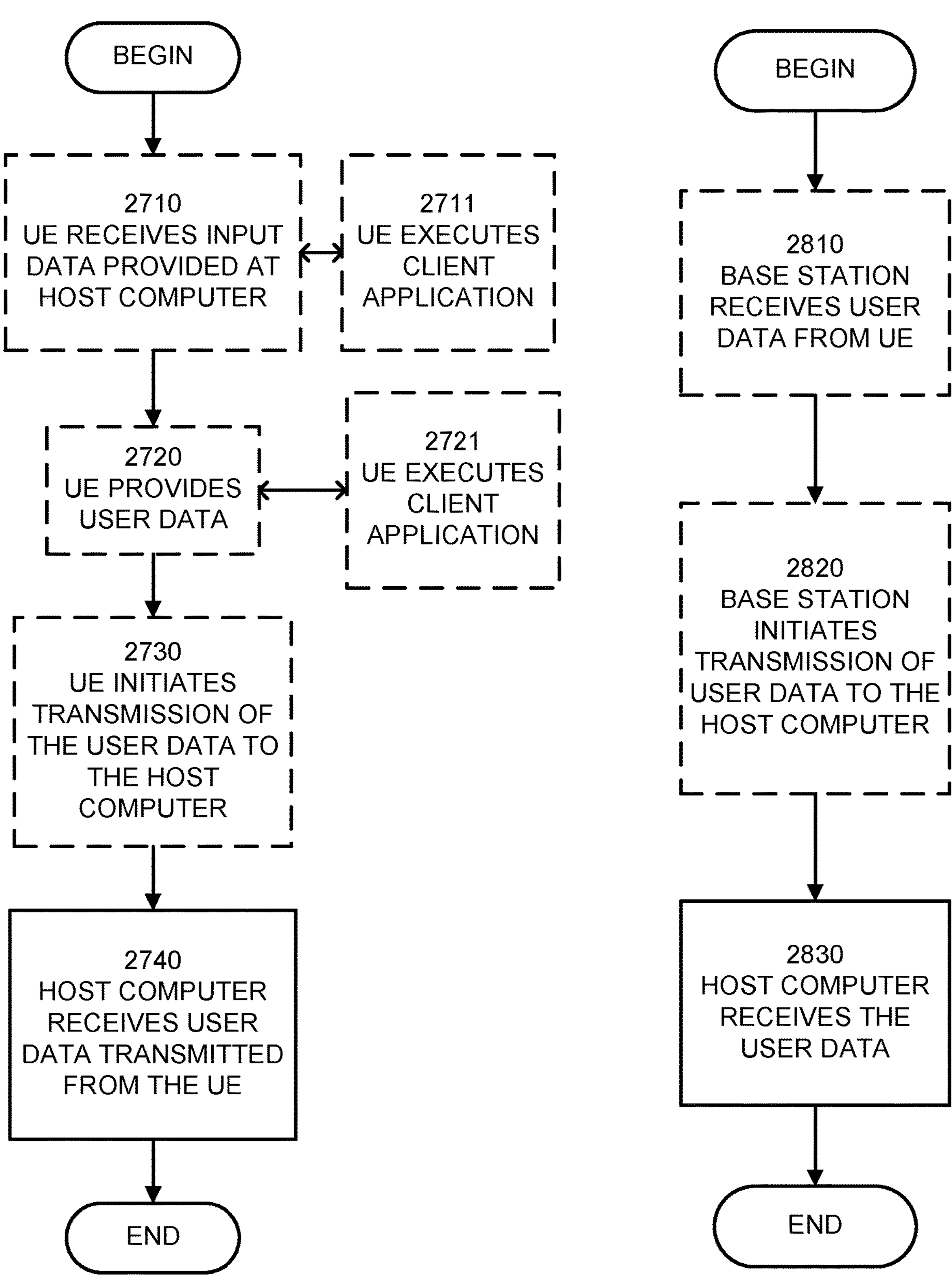
FIG. 27 is a block diagram of methods implemented in a communication system including a host computer, a base station and a user equipment in accordance with some embodiments.
FIG. 28 is a block diagram of methods implemented in a communication system including a host computer, a base station and a user equipment in accordance with some embodiments.

FIG. 27 illustrates methods implemented in a communication system including a host computer, a base station and a user equipment in accordance with some embodiments FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 2710 (which may be optional), the UE receives input data provided by the host computer. Additionally or alternatively, in step 2720, the UE provides user data. In substep 2721 (which may be optional) of step 2720, the UE provides the user data by executing a client application. In substep 2711 (which may be optional) of step 2710, the UE executes a client application which provides the user data in reaction to the received input data provided by the host computer. In providing the user data, the executed client application may further consider user input received from the user. Regardless of the specific manner in which the user data was provided, the UE initiates, in substep 2730 (which may be optional), transmission of the user data to the host computer. In step 2740 of the method, the host computer receives the user data transmitted from the UE, in accordance with the teachings of the embodiments described throughout this disclosure.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 2810 (which may be optional), in accordance with the teachings of the embodiments described throughout this disclosure, the base station receives user data from the UE. In step 2820 (which may be optional), the base station initiates transmission of the received user data to the host computer. In step 2830 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a user equipment, UE, comprising:

receiving, from a master node (MN), a request for adding a secondary cell group (SCG), including a SCG configuration and an indication that the SCG to be added is to operate in a deactivated mode of operation;

determining a mode of operation of the SCG to be the deactivated mode of operation based on the indication that the SCG to be added is to operate in the deactivated mode of operation; and determining to delay performing random access.

2. The method of claim 1, wherein determining to delay performing random access comprises to delay performing random access until a command to activate the SCG is received.

3. The method of claim 1, wherein the method further comprises delaying starting a timer T304 until a command to activate the SCG is received.

4. The method of claim 1, further comprising:

applying the SCG configuration in accordance with the deactivated mode of operation of the SCG.

5. The method of claim 4 wherein the request further includes a Reconfiguration With Sync information element, IE, including a random access configuration and applying the SCG configuration comprises:

applying the SCG configuration to operate in a deactivated mode of operation responsive to the mode of operation in the request indicating a deactivated mode of operation wherein the UE stores ReconfigurationWithSync IE and applies the ReconfigurationWithSync IE upon receiving a command to activate the SCG upon which the UE starts a timer T304 and performs random access.

6. The method of claim 5 wherein the ReconfigurationWithSync IE further includes a timer value for the timer T304.

7. The method of claim 5 wherein the ReconfigurationWithSync IE further includes a Cell Radio Network Temporary Identifier, C-RNTI, for a medium access control, MAC, SCG.

8. The method of claim 5 wherein the ReconfigurationWithSync IE further includes a synchronization signal block, SSB, Measurement Timing Configuration, SMTC.

9. The method of claim 5 wherein the ReconfigurationWithSync IE further includes a contention free random access configuration for random access resource selection.

10. The method of claim 9 wherein the contention free random access configuration includes at least one of a channel state information reference signal, CSI-RS, configuration and a SSB configuration.

11. A user equipment, UE, adapted to:

receive, from a master node (MN), a request for adding a secondary cell group (SCG), including a secondary cell group, SCG configuration and an indication that the SCG to be added is to operate in a deactivated mode in operation;

determine the mode of operation of the SCG to be the deactivated mode of operation based on the indication that the SCG to be added is to operate in the deactivated mode of operation; and determine to delay performing random access.

12. The UE of claim 11 wherein determining to delay performing random access comprises to delay performing random access until a command to activate the SCG is received.

13. A user equipment, UE, comprising:

processing circuitry; and memory coupled with the processing circuitry, wherein the memory includes instructions that when executed by the processing circuitry causes the UE to perform operations comprising:

receiving, from a master node (MN), a request for adding a secondary cell group (SCG), including a secondary cell group, SCG configuration and an indication that the SCG to be added is to operate in a deactivated mode of operation;

determining the mode of operation of the SCG to be the deactivated mode of operation based on the indication that the SCG to be added is to operate in the deactivated mode of operation; and determine to delay performing random access.

14. The UE according to claim 13 wherein the memory includes further instructions that wherein determining to delay performing random access comprises to delay performing random access until a command to activate the SCG is received.

15. A computer program product comprising a non-transitory storage medium including program code to be executed by processing circuitry of a user equipment, UE, whereby execution of the program code causes the UE to perform operations comprising:

receiving, from a master node (MN), a request for adding a secondary cell group (SCG), including a secondary cell group, SCG configuration and an indication that the SCG to be added is to operate in a deactivated mode of operation;

determining the mode of operation of the SCG to be the deactivated mode of operation based on the indication that the SCG to be added is to operate in the deactivated mode of operation; and determining to delay performing random access.

16. The computer program product of claim 15 comprising further program code to be executed by processing circuitry of a user equipment, UE, wherein determining to delay performing random access comprises to delay performing random access until a command to activate the SCG is received.

* * * * *